United States Patent
Goto et al.

(10) Patent No.: US 11,770,165 B2
(45) Date of Patent: Sep. 26, 2023

(54) WIRELESS COMMUNICATION DEVICE AND SELECTION METHOD

(71) Applicant: SONY GROUP CORPORATION, Tokyo (JP)

(72) Inventors: Jungo Goto, Tokyo (JP); Yasuo Kubo, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/755,106

(22) PCT Filed: Oct. 30, 2019

(86) PCT No.: PCT/JP2019/042695
§ 371 (c)(1),
(2) Date: Apr. 21, 2022

(87) PCT Pub. No.: WO2021/084669
PCT Pub. Date: May 6, 2021

(65) Prior Publication Data
US 2022/0407574 A1  Dec. 22, 2022

(51) Int. Cl.
| | | |
|---|---|---|
| H04B 7/06 | (2006.01) | |
| H04B 7/0404 | (2017.01) | |
| H04B 7/08 | (2006.01) | |

(52) U.S. Cl.
CPC ......... *H04B 7/0608* (2013.01); *H04B 7/0404* (2013.01); *H04B 7/0834* (2013.01)

(58) Field of Classification Search
CPC .. H04B 7/0608; H04B 7/0404; H04B 7/0834; H04B 1/0466; H04B 1/38; H04B 7/0691; H04B 7/0805; H04B 7/0874
See application file for complete search history.

(56) References Cited

U.S. PATENT DOCUMENTS

| | | |
|---|---|---|
| 10,193,602 B1 | 1/2019 | Frydman |
| 2006/0003713 A1 | 1/2006 | Ouzillou |

(Continued)

FOREIGN PATENT DOCUMENTS

| | | |
|---|---|---|
| CN | 104919721 A | 9/2015 |
| JP | 2000-259295 A | 9/2000 |

(Continued)

OTHER PUBLICATIONS

International Search Report and Written Opinion of PCT Application No. PCT/JP2019/042695, dated Dec. 17, 2019, 07 pages of ISRWO.

*Primary Examiner* — Hashim S Bhatti
(74) *Attorney, Agent, or Firm* — CHIP LAW GROUP

(57) ABSTRACT

The wireless communication device (200) according to the present disclosure includes the control unit (260). The control unit (260) acquires the temperatures of a plurality of antennas (2110) having different directivities. The control unit (260) acquires information regarding the communication quality of the plurality of antennas (2110). In a case where the temperature of the antenna which is being used for communication is equal to or higher than the second temperature threshold which is lower than the first temperature threshold for determining whether or not to stop using the antenna (2110), the control unit (260) switches the antenna which is being used to an antenna selected on the basis of the communication quality among the antennas whose temperatures are lower than the second temperature threshold.

10 Claims, 22 Drawing Sheets

(56) References Cited

U.S. PATENT DOCUMENTS

| | | | |
|---|---|---|---|
| 2014/0199952 A1 | 7/2014 | Sandhu et al. | |
| 2019/0069304 A1 | 2/2019 | Chang et al. | |
| 2020/0328785 A1* | 10/2020 | Lee | H04B 7/0695 |
| 2021/0360432 A1* | 11/2021 | Mo | H04B 7/0617 |
| 2022/0302970 A1* | 9/2022 | Stauffer | H04B 7/0608 |

FOREIGN PATENT DOCUMENTS

| | | |
|---|---|---|
| JP | 2003-318752 A | 11/2003 |
| JP | 2016-509783 A | 3/2016 |
| KR | 10-2015-0106911 A | 9/2015 |
| TW | 201914329 A | 4/2019 |

* cited by examiner

WIRELESS COMMUNICATION DEVICE AND SELECTION METHOD

CROSS REFERENCE TO RELATED APPLICATIONS

This application is a U.S. National Phase of International Patent Application No. PCT/JP2019/042695 filed on Oct. 30, 2019. Each of the above-referenced applications is hereby incorporated herein by reference in its entirety.

FIELD

The present disclosure relates to a wireless communication device and a selection method.

BACKGROUND

In recent years, various studies have been conducted on the 5th generation (5G) mobile communication system following LTE/LTE-A. In the 5G, standardization is being carried out to achieve large-capacity communication such as 10 to 20 Gbps by wideband transmission using a frequency band higher than 4G (LTE). While a cellular system in related art provides a service area in a planar manner to support mobility of a wireless communication device, in a case where a frequency band higher than a frequency band used in the 4G is used, it may be difficult to satisfy coverage in related art. In particular, a frequency band higher than 6 GHz provides narrow coverage and very strong straightness, and thus, a transmission/reception device is over the horizon due to shielding by buildings, people, vehicles, or the like, which may make it difficult to obtain sufficient radio field strength. It is therefore expected to achieve extremely high throughput within coverage of the frequency band higher than 6 GHz while ensuring coverage by combining the frequency band with the band of 6 GHz or lower.

As described above, in a case where a frequency band higher than 6 GHz is used, not only a propagation loss is large, but also communication quality may significantly degrade due to presence of moving obstacles such as people and vehicles, which may make it difficult to achieve stable communication. Assuming such a situation, there is, for example, a case where communication quality during data transmission/reception is ensured by providing a plurality of communication units (for example, antenna modules) for a wireless communication device and selectively switching the communication unit to be used and a beam pattern to be applied. For example, a technique is known in which in a case where the beam pattern is selectively switched, communication is performed while selecting an antenna having the highest reception sensitivity from a communication partner (see, for example, Patent Literature 1).

CITATION LIST

Patent Literature

Patent Literature 1: JP 2000-259295 A

SUMMARY

Technical Problem

However, for example, a temperature of an antenna is not taken into account in the above-described technique. If the temperature of the antenna rises, such an antenna cannot be used for communication, and there is a risk that communication quality cannot be ensured during data transmission/reception.

The present disclosure therefore provides a technique for enabling communication quality to be ensured for a longer period of time.

Solution to Problem

According to the present disclosure, a wireless communication device is provided. The wireless communication device includes the control unit. The control unit acquires the temperatures of a plurality of antennas having different directivities. The control unit acquires information regarding the communication quality of the plurality of antennas. In a case where the temperature of the antenna which is being used for communication is equal to or higher than the second temperature threshold which is lower than the first temperature threshold for determining whether or not to stop using the antenna, the control unit switches the antenna which is being used to an antenna selected on the basis of the communication quality among the antennas whose temperatures are lower than the second temperature threshold.

DESCRIPTION OF EMBODIMENTS

Figure 1:
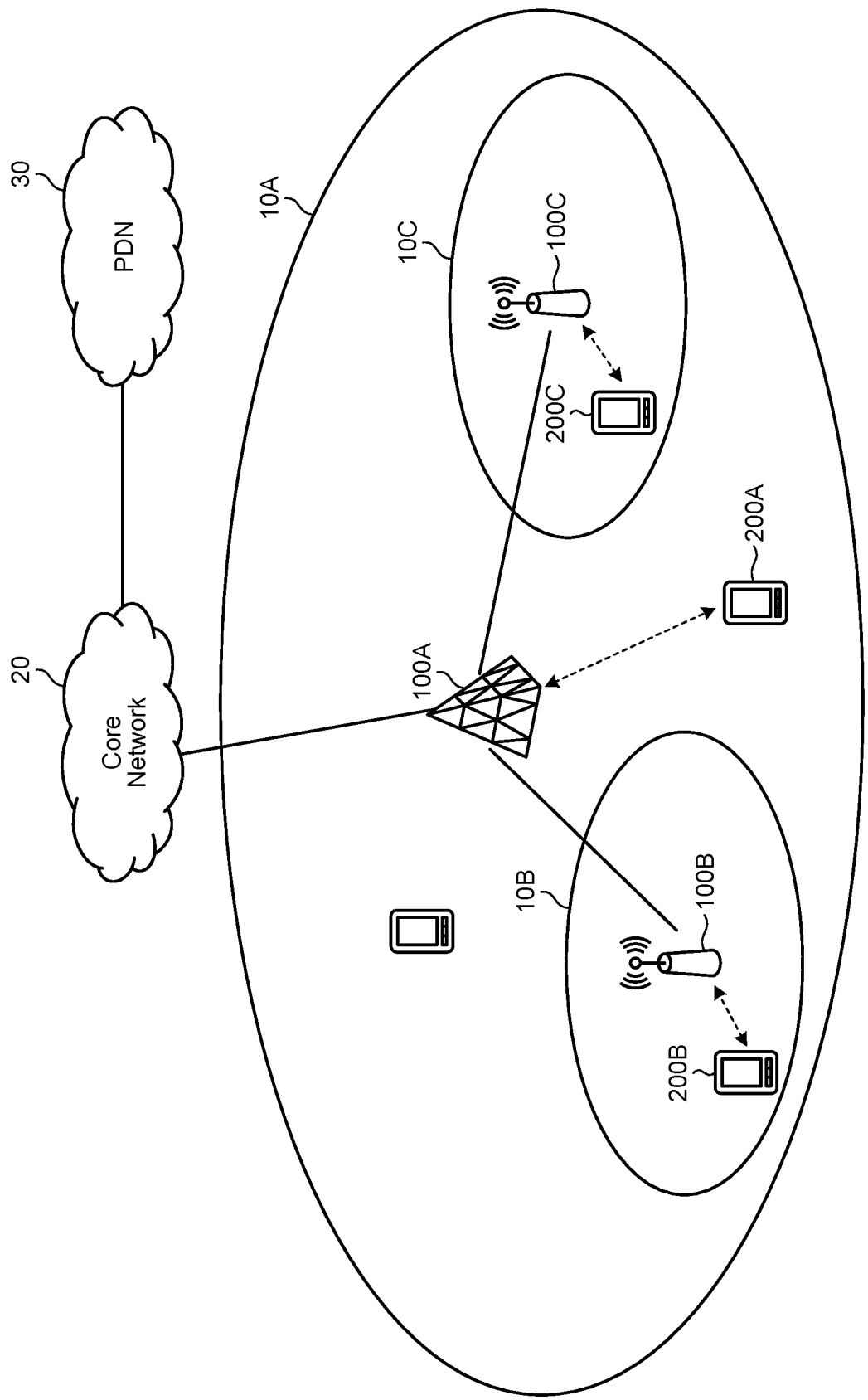
FIG. 1 is a view for explaining an example of a configuration of a system to be applied to each embodiment of the present disclosure.

Hereinafter, preferred embodiments of the present disclosure will be described in detail with reference to the accompanying drawings. In this specification and the drawings, components having substantially the same functional configuration are denoted by the same reference numerals, and redundant description is omitted.

Furthermore, in this specification and the drawings, components having substantially the same functional configuration will be distinguished by giving the same reference numerals followed by different alphabets or numbers in some cases. In one example, a plurality of components having substantially the same functional configuration is distinguished, like wireless communication devices 200A, 200, and 200C, as necessary. Unless, however, it is necessary to particularly distinguish each of the plurality of components having substantially the same functional configuration, it is only to attach the same reference numeral. In one example, wireless communication devices 200A, 200, and 200C are simply referred to as wireless communication devices 200 unless it is particularly necessary to distinguish them.

Note that description will be provided in the following order.

1. Introduction
  1.1. System configuration example
  1.2. Overview of proposed technique
2. First Embodiment
  2.1. Functional configuration example
  2.2. Configuration example of wireless communication module
  2.3. Arrangement example of antenna modules
  2.4. Antenna selection processing
  2.5. Modifications
   2.5.1. Modification 1
   2.5.2. Modification 2
3. Second Embodiment
  3.1. Functional configuration example
  3.2. Antenna selection processing
4. Third Embodiment
  4.1. Functional configuration example
  4.2. Antenna selection processing
  4.3. Traffic control processing
5. Other modifications
6. Hardware configuration example
7. Conclusion 1. Introduction 1.1. System Configuration Example FIG. 1 is a view for explaining an example of a configuration of a system to be applied to each embodiment of the present disclosure. As illustrated in FIG. 1, a system 1 according to each embodiment of the present disclosure includes a base station 100 (100A to 100C) and a wireless communication device 200 (200A to 200C).

The base station 100 is a communication device that operates a cell 10 (10A to 10C) and provides wireless service to one or more wireless communication devices 200 located inside the cell 10. For example, the base station 100A provides wireless service to the wireless communication device 200A, the base station 100B provides wireless service to the wireless communication device 200B, and the base station 100C provides wireless service to the wireless communication device 200C. The cell 10 may be operated in accordance with any wireless communication scheme such as long term evolution (LTE), LTE-Advanced (LTE-A), and 5G. It is assumed that the 5G includes new radio (NR), new radio access technology (NRAT), and further evolved universal terrestrial radio access (FEUTRA).

The base station 100A is a macrocell base station that operates a macrocell 10A. The macrocell base station 100A is connected to a core network 20. The core network 20 is connected to a packet data network (PDN) 30 via a gateway device (not illustrated).

The base stations 100B and 100C are small cell base stations that respectively operate the small cells 10B and 10C. The small cell base stations 100B and 100C are connected to the macrocell base station 100A.

The core network 20 can include, for example, mobility management entity (MME), a serving gateway (S-GW), a PDN gateway (P-GW), a policy and charging rule function (PCRF), and a home subscriber server (HSS). Alternatively, the core network 20 can include 5G entity having functions similar to functions of these. The MME, which is a control node that handles signals on a control plane, manages a mobile state of the wireless communication device. The S-GW, which is a control node that handles signals on a user plane, is a gateway device that switches a transfer path of user data. The P-GW, which is a control node that handles signals on the user plane, is a gateway device that serves as a connection point between the core network 20 and the PDN 30. The PCRF is a control node that controls policy such as quality of service (QoS) for bearers, and billing. The HSS is a control node that handles subscriber data and controls service.

The wireless communication device 200 is a communication device that performs wireless communication with the base station 100 on the basis of control by the base station 100. The wireless communication device 200 may be a so-called user terminal (user equipment: UE). For example, the wireless communication device 200 transmits an uplink signal to the base station 100 and receives a downlink signal from the base station 100.

It is assumed that the wireless communication device 200 starts wireless communication with the base station 100, for example, in accordance with a non-stand alone (NSA) scheme of a 5G-NR communication system. The NSA scheme is a scheme that uses an LTE line to implement 5G-NR communication. In the NSA scheme, the wireless communication device 200 is connected (attached) to the base station 100 using an LTE line, and then transmits and receives data signals using a 5G-NR line.

Specifically, in a case of the NSA scheme, the wireless communication device 200 is attached to the base station 100 in accordance with LTE after performing cell search. Subsequently, the wireless communication device 200 measures communication quality of the 5G-NR set from the base station 100 and transmits a result (measurement report) to the base station 100. After that, the wireless communication device 200 receives additional settings of a primary secondary cell (PS cell) of the 5G-NR from the base station 100. As a result, procedure for adding a 5G-NR cell is completed, and the wireless communication device 200 performs 5G-NR communication with the base station 100.

The wireless communication device 200 may perform 5G-NR communication with the base station 100 by the base station 100 adding the 5G-NR cell without receiving the measurement report from the wireless communication device 200. Further, while in the 5G-NR, for example, communication can be performed in different frequencies of a first frequency band and a second frequency band, which will be described later, the wireless communication device 200 can be connected to the base station 100 so as to perform communication in at least one of the first frequency band and the second frequency band.

On the other hand, the technique according to the present disclosure may be also applied to a stand alone (SA) scheme of the 5G-NR communication system. The SA scheme is a scheme in which both control signals and data signals are transmitted and received over a 5G-NR line. Of course, the 5G-NR communication system communication is merely an example, and this technology can be applied to other communication systems.

Note that in the present disclosure, the frequency band is classified into the first frequency band and the second frequency band as described above. The first frequency band is a frequency band higher than a predetermined frequency. The second frequency band is a frequency band lower than a predetermined frequency. For example, the predetermined frequency may be 6 GHz. In other words, the first frequency band may be a frequency band higher than 6 GHz, and the second frequency band may be a frequency band lower than 6 GHz.

As another example, the first frequency band may be a millimeter wave band, and the second frequency band may be a microwave band. The millimeter wave band is a frequency band from 30 GHz to 300 GHz, and the microwave band is a frequency band from 300 MHz to 30 GHz. As another example, the first frequency band may be 26 GHz (n258), 28 GHz (n257, n261), 39 GHz (n260), and Sub6 (n77-79), and the second frequency band is an ultrahigh frequency (UHF). The UHF is a frequency band from 300 MHz to 3 GHz. As another example, the first frequency band may be a super high frequency (SHF) and an extremely high frequency (EHF), and the second frequency band may be an UHF. The SHF is a frequency band from 3 GHz to 30 GHz, and the EHF is a frequency band from 30 GHz to 300 GHz.

In the following, in a case where it is not necessary to distinguish between the macrocell base station 100 and the small cell base station 100, these are collectively referred to as the base station 100. Further, it is assumed that the wireless communication device 200 performs communication with the base station 100 in a cell of the first frequency band by the procedure described above.

1.2. Overview of Proposed Technique

Figure 2:
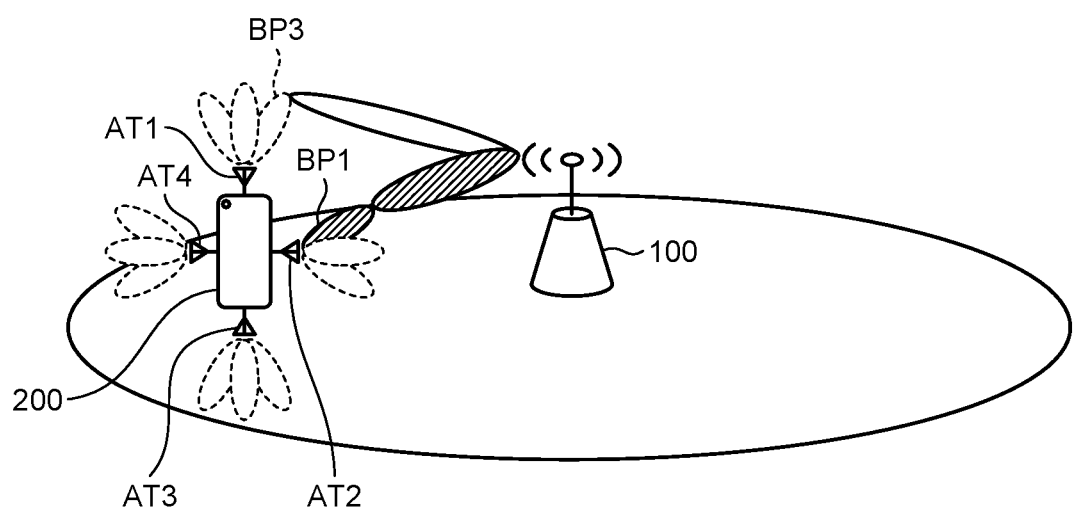
FIG. 2 is a view for explaining an example of a configuration of a system to be applied to each embodiment of the present disclosure.

Overview of the proposed technique will be described with reference to FIG. 2 to FIG. 4. FIG. 2 is a view for explaining an example of a configuration of a system to be adapted to each embodiment of the present disclosure. As illustrated in FIG. 2, the wireless communication device 200 includes antennas AT1 to AT4. Note that while in FIG. 2, the antenna AT is provided outside a chassis of the wireless communication device 200 in order to make it easy to understand a location of the antenna AT, the antenna AT may be provided inside the chassis.

The antennas AT1 to AT4 respectively have different directivities. The antennas AT1 to AT4 can each form a plurality of beams. The wireless communication device 200 performs communication with the base station 100 by selecting, for example, an antenna forming a beam having the highest communication quality with the base station 100.

Specifically, the wireless communication device 200 acquires, for example, a measurement result of received signal strength (for example, a received signal strength indicator (RSSI)) as information regarding communication quality of each of the antennas AT1 to AT4. Alternatively, examples of measured values measured by the wireless communication device 200 as information regarding communication quality can include reference signal received power (RSRP), reference signal received quality (RSRQ), and a signal-to-noise power ratio (SNR), a signal-to-interference power ratio (SIR), a signal-to-interference-and-noise power ratio (SINR), channel state information (CSI), a channel quality indicator (CQI), throughput, a bit rate, or the like, in addition to the received signal strength. In a case where the antennas AT1 to AT4 can each form a plurality of beam patterns, information regarding communication quality may be acquired for each beam pattern of the antennas AT1 to AT4.

In the example of FIG. 2, it is assumed that communication quality of a beam pattern BP1 of the antenna AT2 is the highest (high quality), followed by communication quality of a beam pattern BP3 of the antenna AT1 (medium quality). In addition, it is assumed that communication quality of other antennas AT3 and AT4 is low (low quality) for each beam pattern. In this case, the wireless communication device 200 selects the antenna AT2 as an antenna to be used for communication and performs communication with the base station 100 using the beam pattern BP1 of the antenna AT2.

Here, if the wireless communication device 200 performs communication with the base station 100, a temperature of the antenna AT rises. In particular, in communication using the first frequency band, temperatures of the antenna AT, a power amplifier, and a communication module rise in a shorter period of time than temperatures in communication using the second frequency band. If the antenna AT becomes hot, the antenna AT may be damaged. Thus, for example, in a case where the temperature of the antenna AT exceeds a first temperature threshold $Th_{t1}$, the wireless communication device 200 stops using the antenna AT to prevent the antenna AT from being damaged.

Specifically, the wireless communication device 200 acquires temperature information of the antenna AT from, for example, a sensor provided at the antenna AT. For example, the wireless communication device 200 stops using the antenna AT if the acquired temperature of the antenna AT exceeds a first temperature threshold $Th_{t1}$. As a result, it is possible to prevent the temperature of the antenna AT from becoming equal to or higher than the first temperature threshold $Th_{t1}$ and prevent the damage of the antenna AT.

Figure 3:
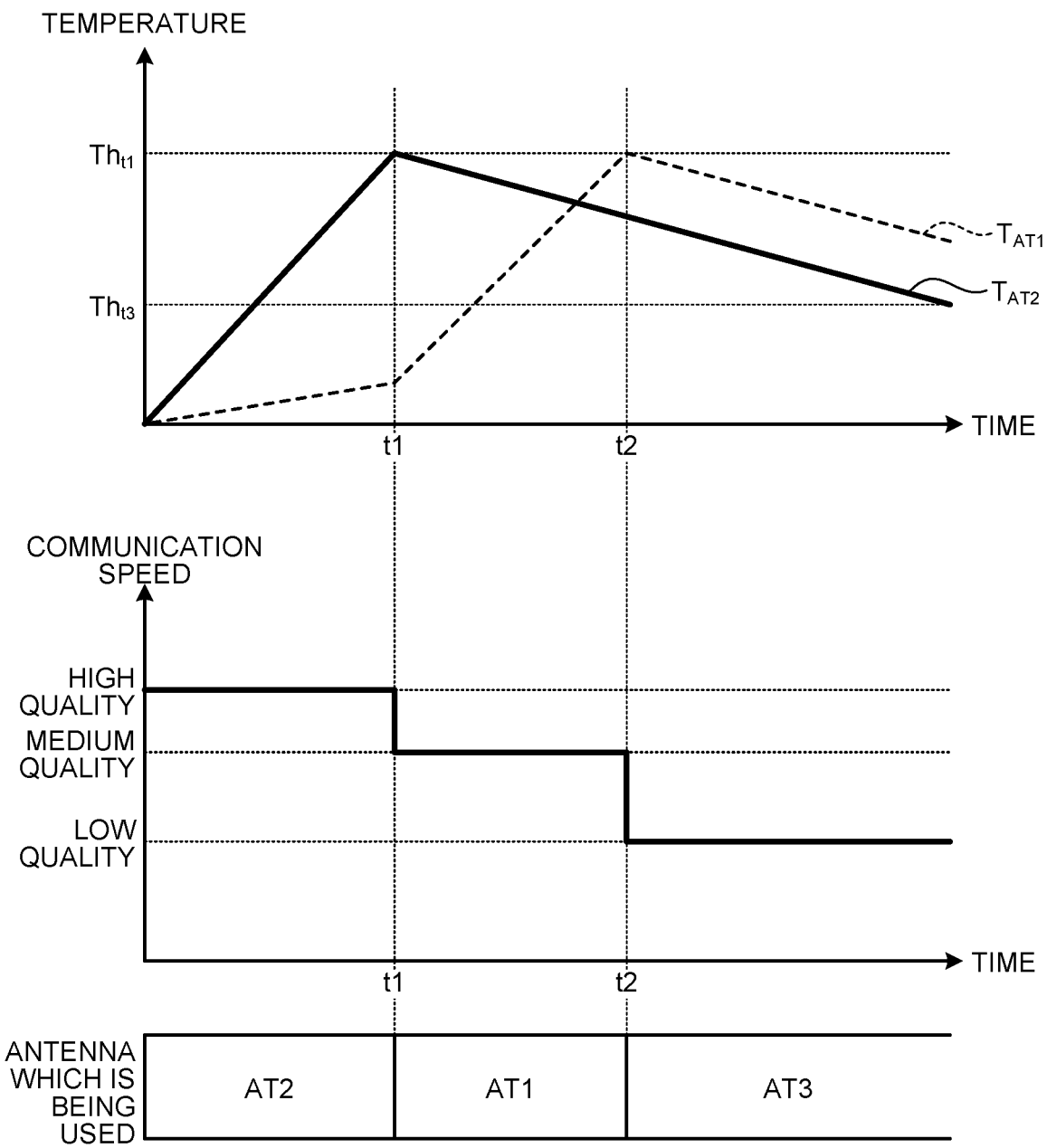
FIG. 3 is a schematic diagram illustrating an example of temperature change of an antenna of a wireless communication device.

FIG. 3 is a schematic diagram illustrating an example of temperature change of the antenna AT of a wireless communication device 200. An upper part of FIG. 3 is a graph illustrating temperature change of the antenna AT1 and the antenna AT2. In FIG. 3, a temperature $T_{AT2}$ of the antenna AT2 is indicated with a solid line, and a temperature $T_{AT1}$ of the antenna AT1 is indicated with a broken line. A middle part of FIG. 3 is a graph illustrating change in the communication quality of the wireless communication device 200. A lower part of FIG. 3 is a view illustrating the antenna AT to be used for communication.

For example, if the wireless communication device 200 starts communication with the base station 100 using the antenna AT2 (see FIG. 2) as an antenna to be used, the temperature $T_{AT2}$ of the antenna AT2 rises as illustrated in FIG. 3. The wireless communication device 200 switches the antenna which is being used from the antenna AT2 to another antenna in a case where the temperature $T_{AT2}$ of the antenna AT2 becomes equal to or higher than the first temperature threshold $Th_{t1}$. In FIG. 3, the temperature $T_{AT2}$ of the antenna AT2 exceeds the first temperature threshold $Th_{t1}$ at a time point t1, and thus, the wireless communication device 200 switches the antenna which is being used from the antenna AT2 to the antenna AT1. As a result, the communication quality of the wireless communication device 200 degrades from high quality to medium quality.

If the wireless communication device 200 switches the antenna which is being used from the antenna AT2 to the antenna AT1 at the time point t1, the temperature $T_{AT2}$ of the antenna AT2 decreases, and the temperature $T_{AT1}$ of the antenna AT1 rises from the time point t1. In the example of FIG. 3, the temperature $T_{AT1}$ of the antenna AT1 rises to the first temperature threshold $Th_{t1}$ at a time point t2. Thus, the wireless communication device 200 switches the antenna which is being used from the antenna AT1 to another antenna at the time point t2.

However, at the time point t2, the temperature $T_{AT2}$ of the antenna AT2 has not dropped to a third temperature threshold $Th_{t3}$, the antenna AT2 cannot be selected as the antenna to be used. Note that the third temperature threshold $Th_{t3}$ is a threshold for the temperature at which use of the antenna AT that has been stopped is resumed.

Thus, the wireless communication device 200 switches the antenna which is being used to another antenna having low communication quality (antenna AT3 in the example of FIG. 3). As a result, the communication quality of the wireless communication device 200 degrades from medium quality to low quality. In the example illustrated in FIG. 3, the communication quality of the wireless communication device 200 gradually degrades, and at the time point t2, the quality degrades to low quality, so that perceived throughput given to the user may decrease.

As described above, if the antenna AT2 having high communication quality is continuously used until the temperature $T_{AT2}$ becomes a high temperature (for example, equal to or higher than the first temperature threshold $Th_{t1}$), it takes time for the temperature $T_{AT2}$ of the antenna AT2 to decrease. Thus, even if the temperature $T_{AT1}$ of the antenna AT1 having the next highest communication quality (medium quality) becomes equal to or higher than the first temperature threshold $Th_{t1}$, the wireless communication device 200 cannot switch the antenna which is being used to the antenna AT2 and results in performing communication using the (low quality) antenna AT3 having low communication quality. This causes a problem that the communication quality of the wireless communication device 200 degrades for a long period of time, and it becomes difficult to secure the communication quality for a long period of time.

Thus, in the proposed technique of the present disclosure, in a case where the temperature of the antenna which is being used is equal to or higher than the second temperature threshold $Th_{t2}$, which is lower than the first temperature threshold $Th_{t1}$, the antenna which is being used is switched to another antenna. In other words, in the proposed technique of the present disclosure, the antenna which is being used is switched to another antenna before it becomes unusable. As a result, the communication quality of the wireless communication device 200 can be maintained for a longer period of time. This point will be described with reference to FIG. 4.

Figure 4:
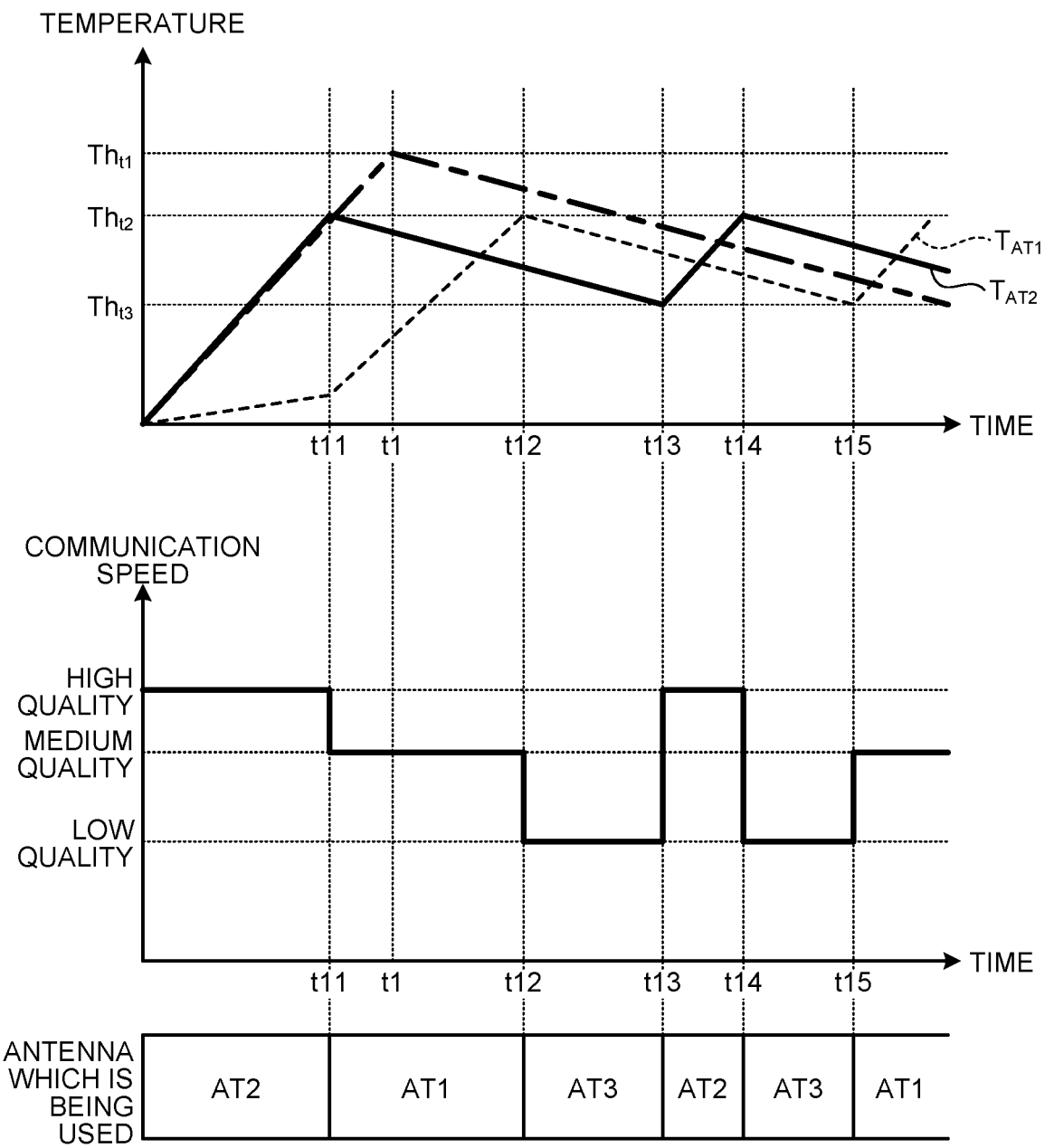
FIG. 4 is a schematic diagram illustrating an example of temperature change of an antenna of a wireless communication device according to a proposed technique of the present disclosure.

FIG. 4 is a schematic diagram illustrating an example of temperature change of the antenna AT of a wireless communication device 200 according to a proposed technique of the present disclosure. An upper part of FIG. 4 is a graph illustrating temperature change of the antenna AT1 and the antenna AT2. In FIG. 4, a temperature $T_{AT2}$ of the antenna AT2 is indicated with a solid line, and a temperature $T_{AT1}$ of the antenna AT1 is indicated with a broken line. In addition, temperature change of the antenna AT2 in a case where use of the antenna AT2 is stopped after the temperature $T_{AT2}$ rises to the first temperature threshold $Th_{t1}$ is indicated with an alternate long and short dash line. A middle part of FIG. 4 is a graph illustrating change in the communication quality of the wireless communication device 200. A lower part of FIG. 4 is a view illustrating the antenna AT to be used for communication.

For example, if the wireless communication device 200 starts communication with the base station 100 using the antenna AT2 as an antenna to be used, the temperature $T_{AT2}$ of the antenna AT2 rises as illustrated in FIG. 4. In the above-described example, the antenna which is being used has been switched from the antenna AT2 to the antenna AT1 at a time point t1 when the antenna AT2 becomes equal to or higher than the first temperature threshold $Th_{t1}$. However, in the proposed technique, the wireless communication device 200 switches the antenna which is being used from the antenna AT2 to the antenna AT1 at a time point t11 when the temperature $T_{AT2}$ of the antenna AT2 becomes equal to or higher than the second temperature threshold $Th_{t2}$ before the time point t1. As a result, the communication quality of the wireless communication device 200 degrades from high quality to medium quality. Further, the temperature $T_{AT1}$ of the antenna AT1 rises.

Subsequently, the wireless communication device 200 switches the antenna which is being used from the antenna AT1 to another antenna at a time point t12 when the temperature $T_{AT1}$ of the antenna AT1 becomes equal to or higher than the second temperature threshold $Th_{t2}$. As illustrated in FIG. 4, at the time point t12, the temperature $T_{AT2}$ of the antenna AT2 is equal to or higher than a third temperature threshold $Th_{t3}$, and thus, the wireless communication device 200 switches the antenna which is being used to another antenna (for example, the antenna AT3) assuming that the antenna AT2 should not be used yet. As a result, the communication quality of the wireless communication device 200 degrades from medium quality to low quality.

Here, as illustrated in FIG. 4, when the temperature $T_{AT2}$ of the antenna AT2 drops below the third temperature threshold $Th_{t3}$ at a time point t13, use of the antenna AT2 can be resumed. Thus, the wireless communication device 200 switches the antenna which is being used from the antenna AT3 to the antenna AT2 at the time point t13. As a result, the communication quality of the wireless communication device 200 increases from low quality to high quality.

At a time point t14, if the temperature $T_{AT2}$ of the antenna AT2 becomes equal to or higher than the second temperature threshold $Th_{t2}$ again, the wireless communication device 200 switches the antenna which is being used from the antenna AT2 to the antenna AT3. As a result, the communication quality of the wireless communication device 200 degrades from high quality to low quality.

When the temperature $T_{AT1}$ of the antenna AT1 drops below the third temperature threshold $Th_{t3}$ at a time point t15, use of the antenna AT1 can be resumed. Thus, the wireless communication device 200 switches the antenna which is being used from the antenna AT3 to the antenna AT1 at the time point t15. As a result, the communication quality of the wireless communication device 200 increases from low quality to medium quality.

As described above, in the proposed technique, in a case where the temperature $T_{AT2}$ of the antenna AT2 becomes equal to or higher than the second temperature threshold $Th_{t2}$, the antenna AT2 is switched to the antenna AT1. As a result, use of the antenna which is being used can be stopped before the temperature becomes high, so that it is possible to shorten a period required for decreasing the temperature to the third temperature threshold Th3 at which use of the antenna is resumed. It is therefore possible to resume use of the antenna AT2 sooner, so that it is possible to make a period of use of the antenna AT2 longer. Furthermore, it is possible to make a period of use of the antenna AT3 shorter. As a result, the communication quality of the wireless communication device 200 can be maintained for a longer period of time.

2. First Embodiment

2.1. Functional Configuration Example

Figure 5:
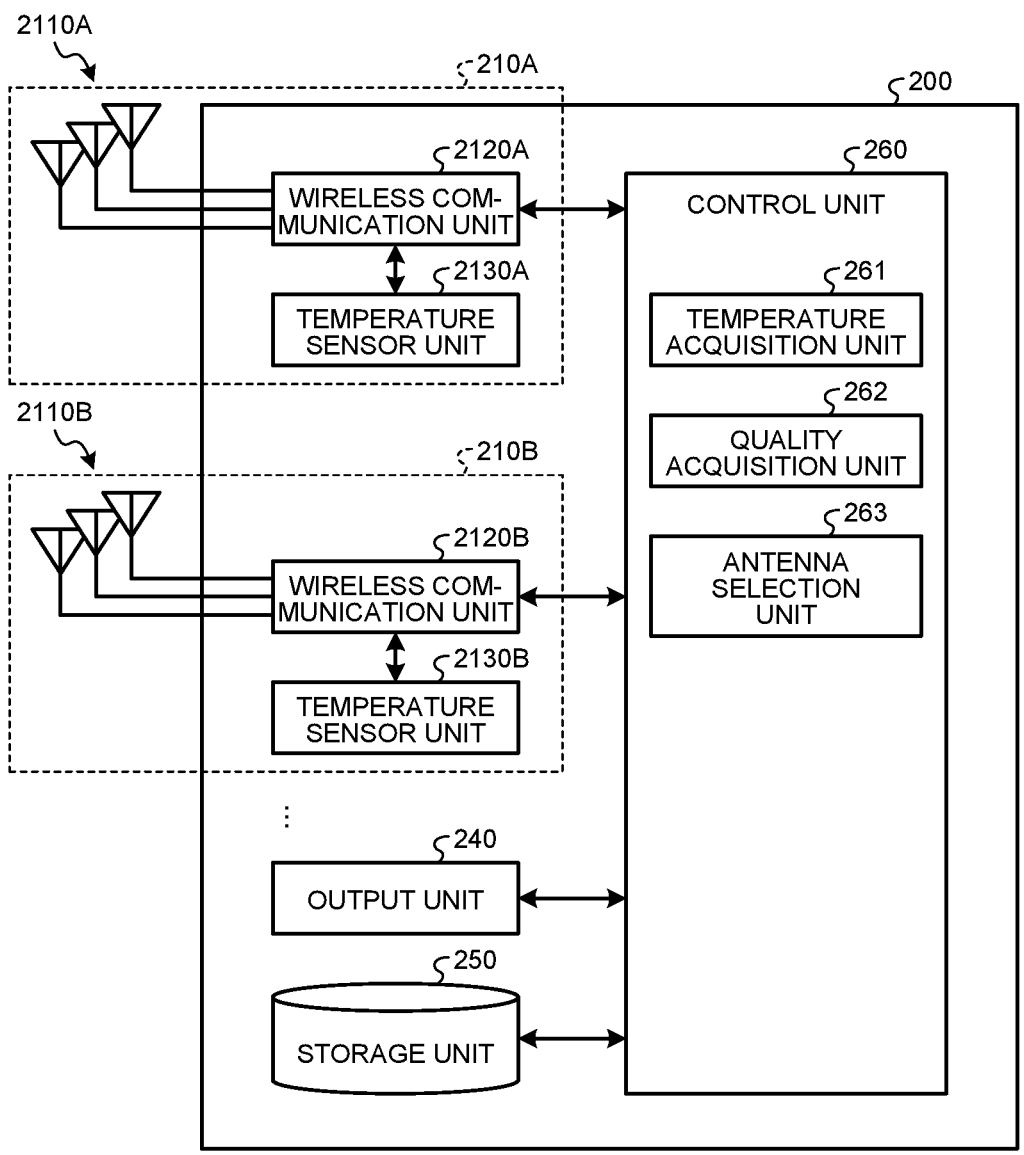
FIG. 5 is a block diagram illustrating an example of a configuration of a wireless communication device according to a first embodiment of the present disclosure.

Subsequently, an example of the configuration of the wireless communication device 200 according to a first embodiment of the present disclosure will be described with reference to FIG. 5. FIG. 5 is a block diagram illustrating an example of a configuration of a wireless communication device 200 according to the first embodiment of the present disclosure. As illustrated in FIG. 5, the wireless communication device 200 includes a plurality of wireless communication modules 210A, 210B, . . . , an output unit 240, a storage unit 250, and a control unit 260. Further, the wireless communication module 210 includes an antenna module 2110, a wireless communication unit 2120, and a temperature sensor unit 2130.

Antenna Module 2110

The antenna module 2110 radiates a signal output by the wireless communication unit 2120 into space as a radio wave. Further, the antenna module 2110 converts a radio wave in space into a signal and outputs the signal to the wireless communication unit 2120.

The antenna module 2110 is an array antenna having a plurality of antenna elements (for example, a plurality of antenna elements constituting a MIMO antenna). In addition to the antenna element, the antenna module can include an antenna switch that switches a connection destination of the antenna element among a plurality of circuits included in the wireless communication unit 2120 (for example, circuits for different wireless communication schemes or transmission circuits/reception circuits). In addition, the antenna module 2110 can include various kinds of devices associated with the antenna elements. Hereinafter, the antenna module may be simply referred to as an antenna.

Wireless Communication Unit 2120

The wireless communication unit 2120 transmits and receives signals. For example, the wireless communication unit 2120 receives a downlink signal from the base station 100 and transmits an uplink signal to the base station 100. Further, the wireless communication unit 2120 acquires information regarding the temperature of the antenna module 2110 (hereinafter, also referred to as temperature information) from the temperature sensor unit 2130. The wireless communication unit 2120 outputs the acquired temperature information to the control unit 260.

Temperature Sensor Unit 2130

The temperature sensor unit 2130 measures the temperature of the antenna module 2110 and generates temperature information. The temperature sensor unit 2130 outputs the generated temperature information to the wireless communication unit 2120.

Output Unit 240

The output unit 240 outputs information to the user. For example, the output unit 240 includes a display device such as a display, a light emitting device such as a light emitting diode (LED), a sound output device such as a speaker, or a vibration device such as an eccentric motor. Then, the output unit 240 outputs an image (still image/moving image), light, sound, or vibration.

Storage Unit 250

The storage unit 250 temporarily or permanently stores a program and various kinds of data for operation of the wireless communication device 200.

Control Unit 260

The control unit 260 functions as an arithmetic processing unit and a control device and controls overall operation in the wireless communication device 200 according to various kinds of programs. The control unit 260 is implemented by an electronic circuit such as a central processing unit (CPU) and a microprocessor. The control unit 260 may include a read only memory (ROM) for storing programs to be used, operation parameters, and the like, and a random access memory (RAM) for temporarily storing parameters, and the like, that change as appropriate.

The control unit 260 includes a temperature acquisition unit 261, a quality acquisition unit 262, and an antenna selection unit 263.

The temperature acquisition unit 261 acquires the temperature of the antenna module 2110 from the wireless communication module 210. The quality acquisition unit 262 has a function of controlling entire processing related to measurement of communication quality accompanied by beam sweeping and acquires information regarding communication quality for each beam pattern of the antenna module 2110 by measuring the communication quality.

The antenna selection unit 263 has a function of controlling the antenna selection processing on the basis of the acquisition results of the temperature acquisition unit 261 and the quality acquisition unit 262. Details of operation of the antenna selection unit 263 will be described in detail later.

2.2. Configuration Example of Wireless Communication Module

Figure 6:
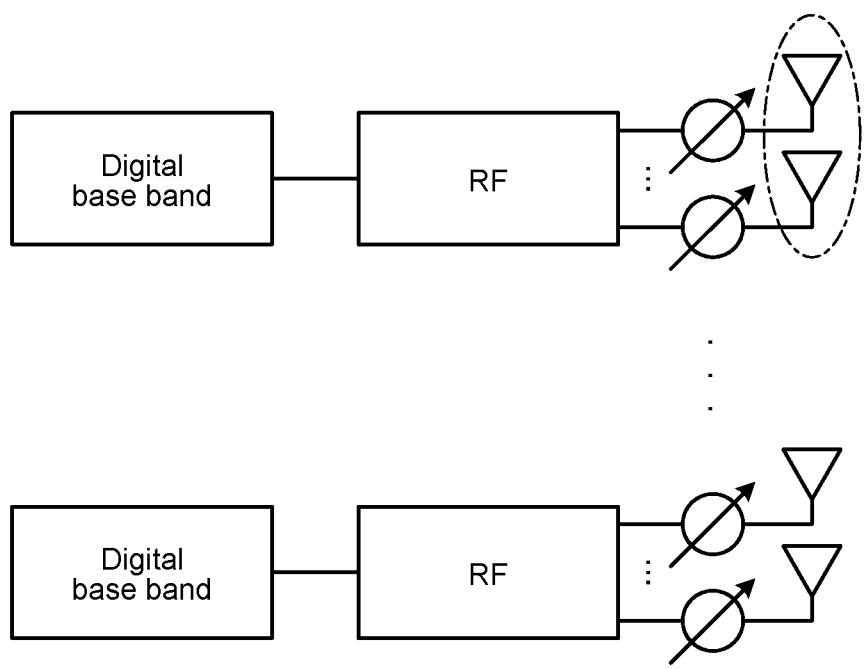
FIG. 6 is a view illustrating an example of a schematic configuration of an antenna device to be applied to the wireless communication device according to the first embodiment of the present disclosure.
Figure 7:
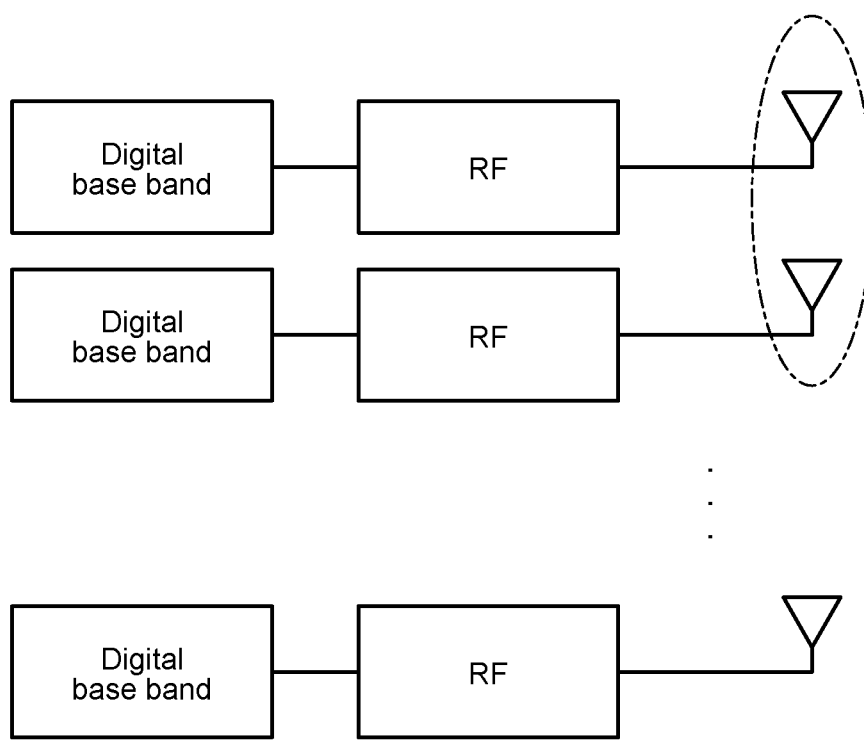
FIG. 7 is a view illustrating an example of a schematic configuration of an antenna device to be applied to the wireless communication device according to the first embodiment of the present disclosure.

An example of a configuration of the wireless communication module 210 to be applied to the wireless communication device 200 according to the first embodiment of the present disclosure will be described. Here, an antenna device which is an example of the wireless communication module 210 will be described with reference to FIG. 6 and FIG. 7. FIG. 6 and FIG. 7 are views illustrating an example of a schematic configuration of an antenna device to be applied to the wireless communication device 200 according to the first embodiment of the present disclosure.

First, the configuration of the antenna device illustrated in FIG. 6 will be described. The antenna device illustrated in FIG. 6 illustrates an example of a case where a plurality of antenna elements constituting an antenna array is connected to a digital base band circuit or a radio frequency (RF) circuit. The RF circuit transmits and receives radio signals via the antenna elements. Thus, the RF circuit can include, for example, components related to reception of a radio signal such as a down-converter and an ADC, components related to transmission of a radio signal such as an up-converter and a DAC, and the like.

Further, in the example illustrated in FIG. 6, each of the plurality of antenna elements is connected to the RF circuit via a phase shifter. On the basis of such a configuration, directivity of a radio signal can be controlled by a phase of the radio signal transmitted and received via each antenna element being controlled. Further, the digital baseband circuit performs modulation processing for transmitting data to be transmitted as a radio signal, processing of demodulating data from a reception result of a radio signal, and the like.

In the example illustrated in FIG. 6, a series of antenna elements constituting an antenna array connected to the digital baseband circuit or the RF circuit can correspond to an example of the "wireless communication module 210" according to the present disclosure. Further, in a situation where a plurality of antenna devices including the digital baseband circuit, the RF circuit, and a series of antenna elements is provided, each antenna device may correspond to an example of the "wireless communication module 210" according to the present disclosure.

Next, a configuration of the antenna device illustrated in FIG. 7 will be described. In the antenna device illustrated in FIG. 7, the digital baseband circuit and the RF circuit are provided for each antenna element to form one unit. On the basis of such a configuration, directivity of a radio signal is controlled by the antenna elements being grouped so that each group includes one or more antenna elements and a phase of the radio signal transmitted and received via each antenna being controlled for each group.

In other words, in the example illustrated in FIG. 7, each of the series of antenna elements (in other words, one or more antenna elements included in the group) for each group can correspond to an example of the "wireless communication module 210" according to the present disclosure. Further, a configuration (that is, a series of antenna devices which is grouped) including a series of antenna elements for each group and the digital baseband circuit or the RF circuit connected to the antenna elements may correspond to an example of the "wireless communication module 210" according to the present disclosure.

2.3. Arrangement Example of Antenna Modules

For each antenna module 2110, a communicable direction is defined in accordance with arrangement of the antenna elements. In other words, a direction of a beam that can be formed is defined for each antenna module 2110.

The wireless communication device 200 has one or more antenna modules 2110. In other words, the wireless communication device 200 has one or more communicable directions. In order to enable communication of radio waves arriving from more directions, it is desirable that a plurality of antenna modules 2110 is arranged in different positions and orientations in the wireless communication device 200. An example of arrangement of the antenna modules 2110 in the wireless communication device 200 will be described with reference to FIG. 8.

Figure 8:
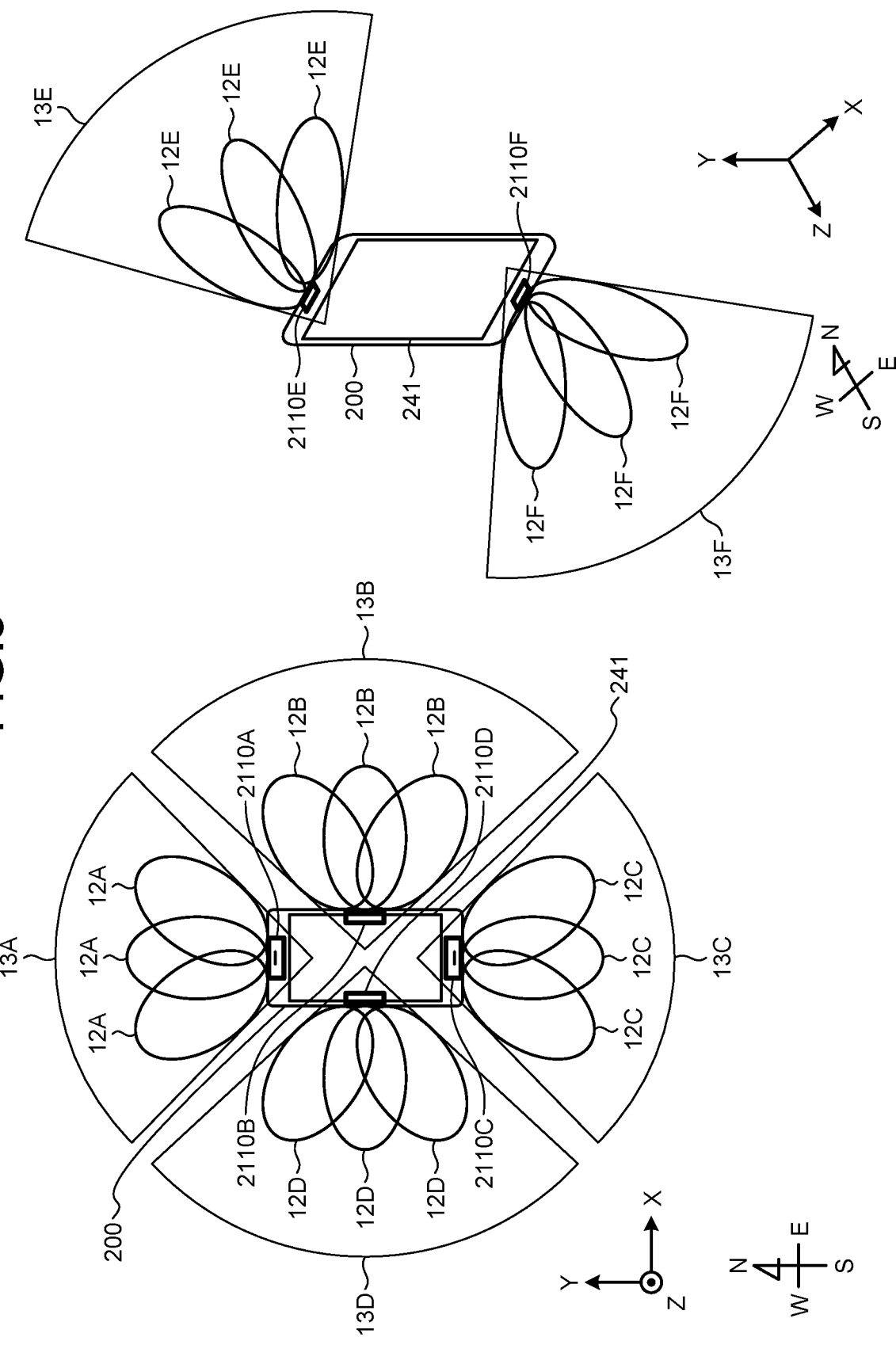
FIG. 8 is a view illustrating an example of arrangement of antenna modules in the wireless communication device according to the first embodiment of the present disclosure.

FIG. 8 is a view illustrating an example of arrangement of antenna modules 2110 in the wireless communication device 200 according to the first embodiment of the present disclosure. As illustrated in FIG. 8, a display surface of a display 241 of the wireless communication device 200 is defined as an XY plane, a long side direction of the display 241 is defined as a Y axis, and a short side direction of the display 241 is defined as an X axis. An axis orthogonal to the display 241 is defined as a Z axis, a front surface side (that is, a front side) of the display 241 is defined as a positive direction of the Z axis, and a back surface side (that is, a rear side) of the display 241 is defined as a negative direction of the Z axis. Posture of the wireless communication device 200 is different between a left part and a right part of FIG. 8. In the left part of FIG. 8, the positive direction of the X axis faces east, the positive direction of the Y axis faces north, and the negative direction of the Z axis faces a vertical direction. In the right part of FIG. 8, the positive direction of the X axis faces east, the negative direction of the Y axis faces the vertical direction, and the positive direction of the Z axis faces south.

In the example illustrated in FIG. 8, six antenna modules 2110 (2110A to 2110F) are provided at different positions of the wireless communication device 200. The six antenna modules 2110 can form three beams 12 in different directions, and respectively have different communicable directions (that is, directions) 13. The communicable direction 13 of the antenna module 210 is a direction covered by a plurality of beams which can be formed.

Specifically, as illustrated in a left part of FIG. 8, the antenna module 2110A is provided at an end portion of the wireless communication device 200 in the positive direction of the Y axis. The antenna module 2110A can form three beams 12A having different directions on the XY plane on a side of the positive direction of the Y axis. The communicable direction 13A of the antenna module 2110A is a direction covered by the beam 12A, and in the example illustrated in FIG. 8, has a width from east to west centered on the north direction. The antenna module 2110B is provided at an end portion of the wireless communication device 200 in the positive direction of the X axis and can form three beams 12B having different directions on the XY plane on a side of the positive direction of the X axis, and the communicable direction 13B of the antenna module 2110B has a width from north to south centered on the east direction. The antenna module 2110C is provided at an end portion of the wireless communication device 200 in the negative direction of the Y axis and can form three beams 12C having different directions on the XY plane on a side of the negative direction of the Y axis, and the communicable direction 13C of the antenna module 2110C has a width from east to west centered on the south direction. The antenna module 2110D is provided at an end portion of the wireless communication device 200 in the negative direction of the X axis and can form three beams 12D having different directions on the XY plane on a side of the negative direction of the X axis, and the communicable direction 13D of the antenna module 2110D has a width from north to south centered on the west direction.

As illustrated in the right part of FIG. 8, an antenna module 2110E is provided at an end portion of the wireless communication device 200 in the positive direction of the Y axis and can form three beams 12E having different directions on the XZ plane on a side of the negative direction of the Z axis, and the communicable direction 13E of the antenna module 2110E has a width from east to west centered on the north direction. The antenna module 2110F is provided at an end portion of the wireless communication device 200 in the negative direction of the Y axis and can form three beams 12F having different directions on the XY plane on a side of the positive direction of the Z axis, and the communicable direction 13F of the antenna module 2110F has a width from east to west centered on the south direction.

Figure 9:
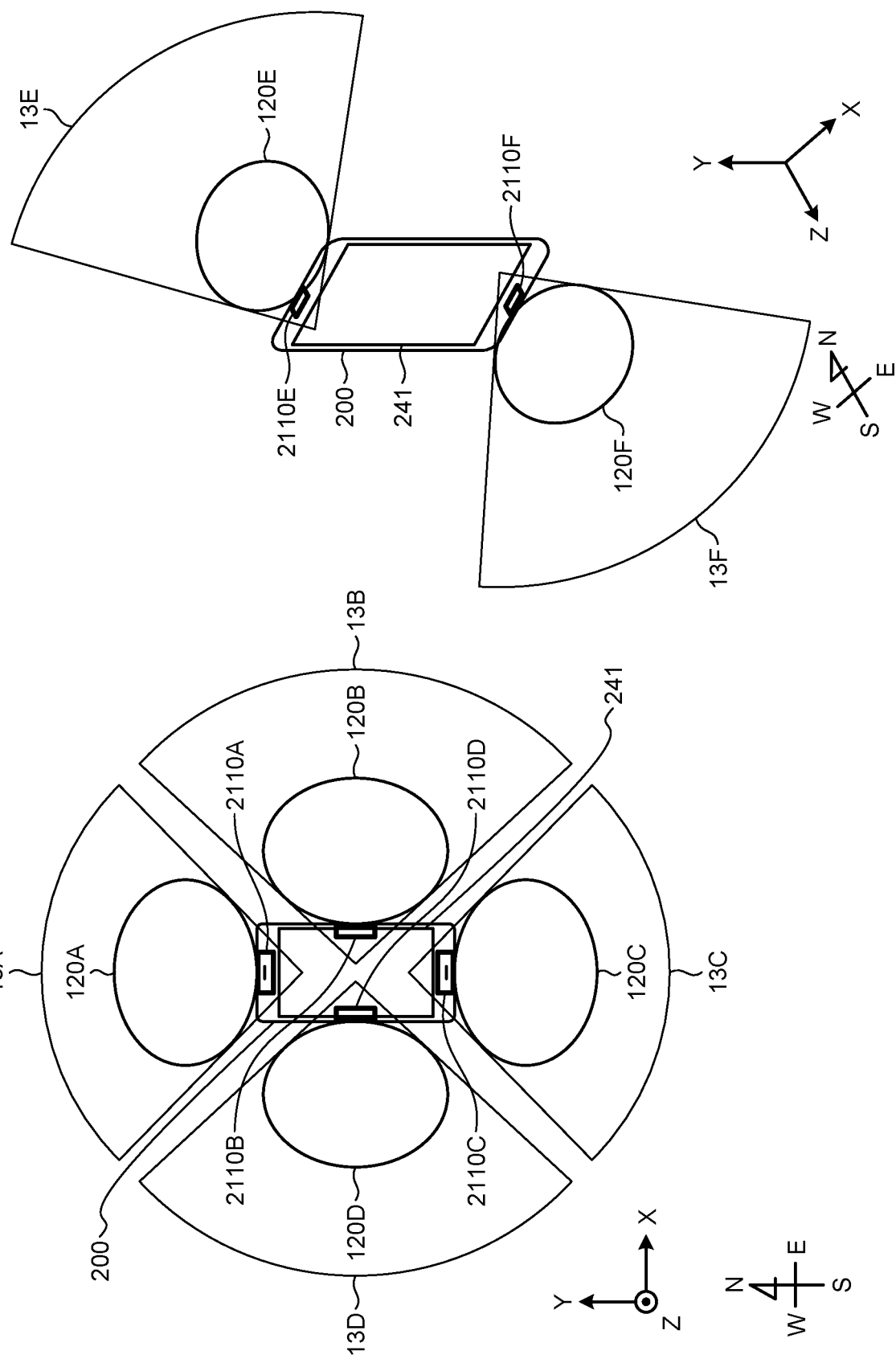
FIG. 9 is a view illustrating an example of arrangement of antenna modules in the wireless communication device according to the first embodiment of the present disclosure.

The beam 12 illustrated in FIG. 8 is a narrow beam having a narrow beam width, and the width of the beam 12 can be changed depending on the wireless communication module 210. For example, the antenna module 2110 may be able to form a beam 120 (wide beam) having a wider beam width than the beam width of the beam 12 as illustrated in FIG. 9, in addition to the beam illustrated in FIG. 8. Note that FIG. 9 is a view illustrating an example of arrangement of antenna modules 2110 in the wireless communication device 200 according to the first embodiment of the present disclosure. The beam 120 illustrated in FIG. 9 is the same as the beam 12 illustrated in FIG. 8 except for the beam width, and thus, description thereof will be omitted.

In a case of a smartphone, it is assumed that a beam can be formed in six plane directions (positive and negative directions of each axis) as described with reference to FIG. 8 and FIG. 9. Typically, the wireless communication device 200 measures a downlink measurement signal while switching between 18+6 beams of beams 12A to 12F and 120A to 120F and selects a combination of the antenna module 2110 and the beams 12 and 120 having the best communication quality.

2.4. Antenna Selection Processing

Figure 10:
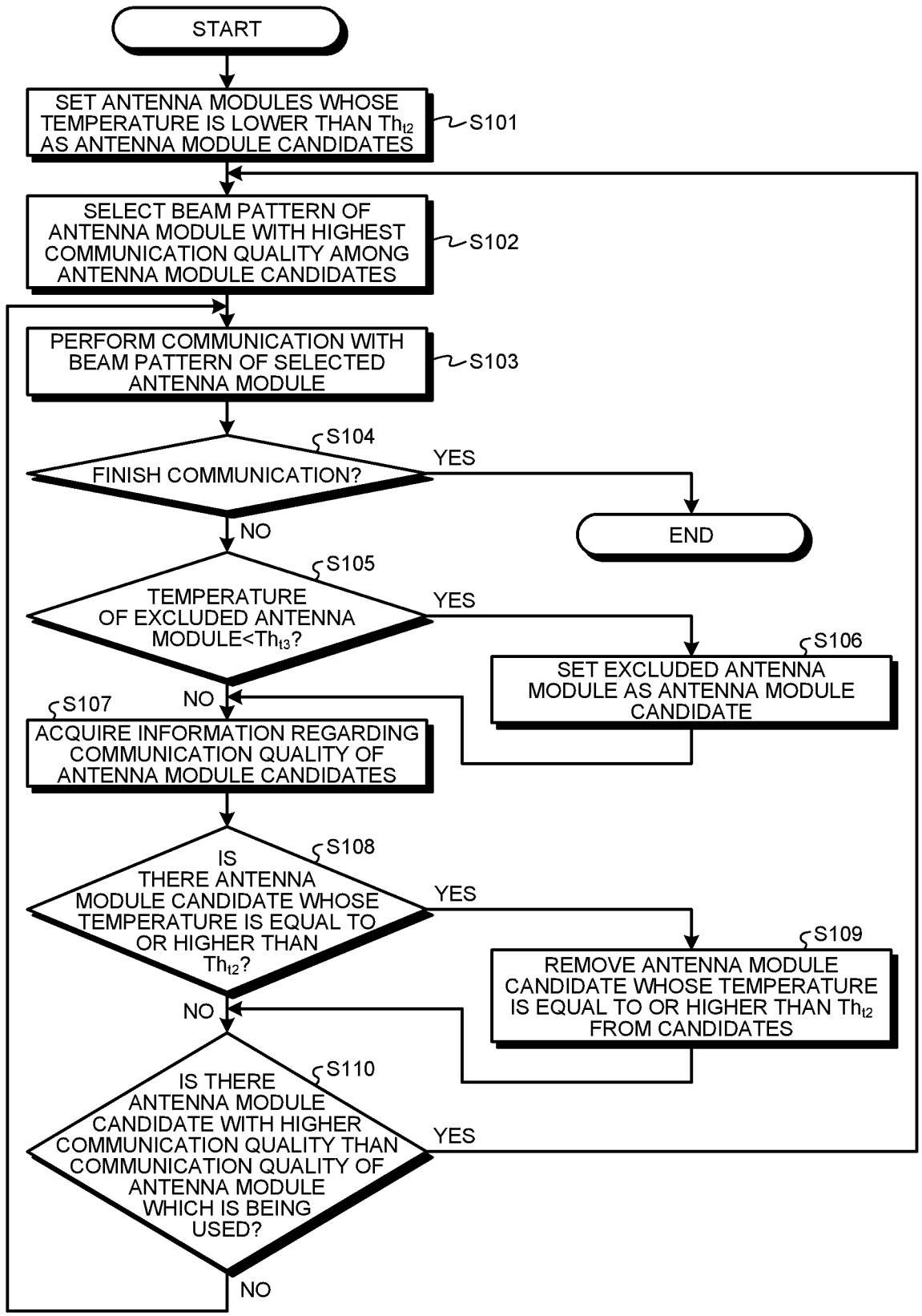
FIG. 10 is a flowchart illustrating an example of flow of antenna selection processing to be executed at the wireless communication device according to the first embodiment of the present disclosure.

FIG. 10 is a flowchart illustrating an example of flow of antenna selection processing to be executed at the wireless communication device 200 according to the first embodiment of the present disclosure. The antenna selection processing is mainly executed by the antenna selection unit 263 of the wireless communication device 200. Further, the antenna selection processing is repeatedly executed, for example, from when communication of the wireless communication device 200 is started until the communication ends.

As illustrated in FIG. 10, the wireless communication device 200 sets antenna modules whose temperatures are lower than the second temperature threshold $Th_{t2}$ among the plurality of antenna modules 2110 as antenna module candidates (Step S101).

Next, the wireless communication device 200 selects, for example, a beam pattern of the antenna module having the highest communication quality among the antenna module candidates (Step S102). The wireless communication device 200 determines the selected antenna module as the antenna module to be used. The wireless communication device 200 performs communication using the beam pattern of the determined antenna module to be used (Step S103). For example, the wireless communication device 200 determines whether or not to finish the communication after a predetermined period of time has elapsed since the communication had been performed in Step S103 (Step S104). In a case where it is determined to finish the communication (Step S104: Yes), the processing is finished.

On the other hand, in a case where it is determined not to finish the communication (Step S104: No), the wireless communication device 200 determines whether or not a temperature of the antenna module (hereinafter, also referred to as the excluded antenna module) not set as the antenna module candidate in Step S101 is lower than the third temperature threshold $Th_{t3}$ (Step S105).

In a case where the temperature of the excluded antenna module is lower than the third temperature threshold $Th_{t3}$ (Step S105: Yes), the wireless communication device 200 sets the excluded antenna module as the antenna module candidate (Step S106), and the processing proceeds to Step S107.

Meanwhile, in a case where the temperature of the excluded antenna module is equal to or higher than the third temperature threshold $Th_{t3}$ (Step S105: No), the wireless communication device 200 does not add the excluded antenna module to the antenna module candidate, and the processing proceeds to Step S107.

Subsequently, the wireless communication device 200 acquires information regarding the communication quality of the antenna module candidates (Step S107). The wireless communication device 200, for example, executes beam measurement of the antenna module candidates and acquires information regarding communication quality for each beam pattern.

The wireless communication device 200 acquires the temperatures of the antenna module candidates and determines whether or not there is an antenna module candidate whose temperature is equal to or higher than the second temperature threshold $Th_{t2}$ (Step S108). The antenna module candidate may include the antenna module which is being used for communication.

In a case where there is an antenna module candidate whose temperature is equal to or higher than the second temperature threshold $Th_{t2}$ (Step S108: Yes), the wireless communication device 200 excludes the antenna module candidate whose temperature is equal to or higher than the second temperature threshold $Th_{t2}$ from antenna selection candidates (Step S109) and sets the antenna module as the excluded antenna module, and the processing proceeds to Step S110.

On the other hand, in a case where there is no antenna module candidate whose temperature is equal to or higher than the second temperature threshold $Th_{t2}$ (Step S108: No), the wireless communication device 200 determines whether or not there is an antenna module candidate having communication quality higher than the communication quality of the antenna module which is being used (Step S110).

In a case where there is an antenna module candidate having higher communication quality (Step S110: Yes), the processing returns to Step S102, and the wireless communication device 200 selects a beam pattern of the antenna module candidate to be used for communication.

On the other hand, in a case where there is no antenna module candidate having higher communication quality (Step S110: No), the processing returns to Step S103, and the wireless communication device 200 continues communication using the antenna module which is being used. In other words, the wireless communication device 200 continues communication without switching the antenna module which is being used.

In a case where the temperature of the antenna module which is being used is equal to or higher than the second temperature threshold $Th_{t2}$ in Step S108 and the antenna module which is being used is set as the excluded antenna module, the processing in Step S110 may be omitted, and the processing may return to Step S102.

As described above, the wireless communication device (for example, the wireless communication device 200) according to the first embodiment of the present disclosure includes a control unit 260. The control unit 260 acquires the temperatures of a plurality of antennas having different directivities (for example, the antenna module 2110), and acquires information regarding the communication quality of the plurality of antennas. In a case where the temperature of the antenna which is being used for communication (for example, the antenna module which is being used) is equal to or higher than the second temperature threshold $Th_{t2}$ which is lower than the first temperature threshold $Th_{t1}$ for determining whether or not to stop using the antenna, the control unit 260 switches the antenna which is being used to an antenna selected on the basis of the communication quality among the antennas whose temperatures are lower than the second temperature threshold $Th_{t2}$.

As a result, the communication quality of the wireless communication device 200 can be maintained for a longer period of time.

2.5. Modifications 2.5.1. Modification 1

In the first embodiment described above, in a case where the temperature of the antenna module 2110 is equal to or higher than the second temperature threshold $Th_{t2}$, the wireless communication device 200 stops using the antenna module 2110. The term "stop using" as used herein means that the antenna module is not used for communication between the wireless communication device 200 and the base station 100. In other words, it means that the wireless communication device 200 does not select the antenna module 2110 as the antenna module to be used. In this case, the wireless communication device 200 sets the antenna module 2110 which the wireless communication device 200 has stopped using as the excluded antenna module. However, actually, even the excluded antenna module which is not used for communication with the base station 100 receives some signals in order to start communication, for example, detect control information, detect synchronization signals, or the like.

Thus, in Modification 1, the antenna module 2110 (excluded antenna module) whose temperature is equal to or higher than the second temperature threshold $Th_{t2}$ is disabled instead of simply use of the antenna module 2110 being stopped. Here, disabled means that the wireless communication device 200 stops at least one of transmission or reception of data using the antenna module 2110, detection of control information (blind decoding), detection of information on synchronization signals (PSS/SSS) or broadcast channel (PBCH) or reception of downlink reference signals (CRS, CSI-RS, PTRS). Alternatively, disabled may refer to increasing a non-active time of discontinuous reception (DRX).

Specifically, for example, the antenna selection unit 263 disables the antenna module which is not set as the antenna module candidate, in other words, the antenna module which is set as the excluded antenna module. As a result, the wireless communication module 210 stops transmission/reception of the above-described data and detection of the control signals, and the like, so that the temperature of the excluded antenna module drops faster than in a case where communication is stopped.

Figure 11:
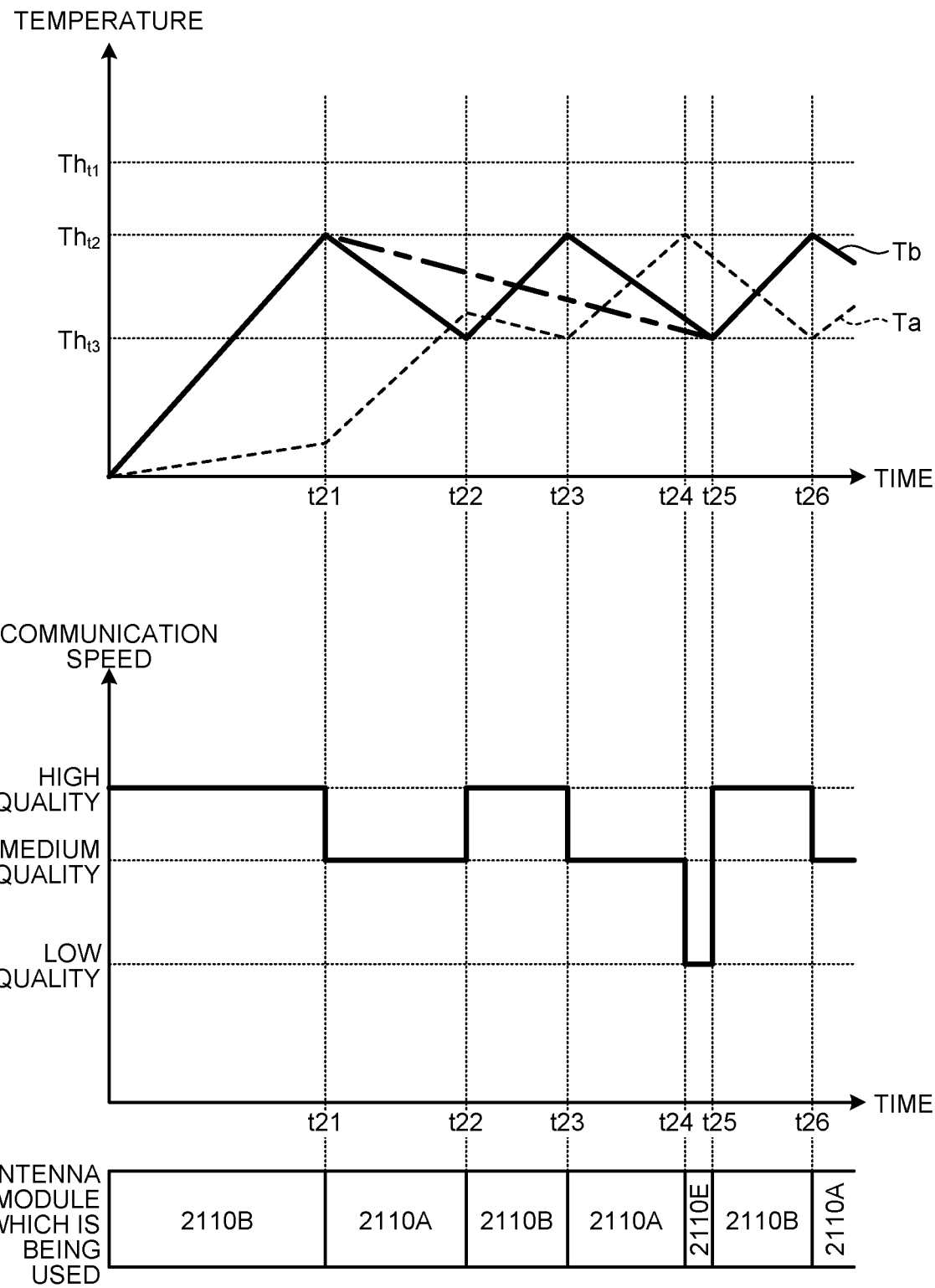
FIG. 11 is a schematic diagram illustrating an example of temperature change of an antenna module of a wireless communication device according to Modification 1 of the present disclosure.

This point will be described with reference to FIG. 11. FIG. 11 is a schematic diagram illustrating an example of temperature change of an antenna module 2110 of a wireless communication device 200 according to Modification 1 of the present disclosure. An upper part of FIG. 11 is a graph illustrating temperature change of the antenna module 2110B and the antenna module 2110A. In FIG. 11, the temperature Tb of the antenna module 2110B is indicated with a solid line, and the temperature Ta of the antenna module 2110A is indicated with a broken line. In addition, the temperature change of the antenna module 2110B in a case where use is stopped in a case where the temperature Tb rises to the second temperature threshold $Th_{t2}$ is indicated with an alternate long and short dash line. A middle part of FIG. 11 is a graph illustrating change in the communication quality of the wireless communication device 200. A lower part of FIG. 11 is a view illustrating the antenna AT to be used for communication.

It is assumed that as for the communication quality of each antenna module, the antenna module 2110B has the highest quality and the antenna module 2110A has the second highest quality. It is assumed that the communication quality of other antenna modules 2110 is low. Further, in order to simplify explanation, it is assumed that the communication quality of each antenna module 2110 does not change.

For example, the wireless communication device 200 starts communication using the antenna module 2110B as the antenna module to be used. As a result, as illustrated in FIG. 11, the temperature Tb of the antenna module 2110B rises.

Thus, the wireless communication device 200 switches the antenna module which is being used to the antenna module 2110A at a time point t21 when the temperature Tb becomes equal to or higher than the second temperature threshold $Th_{t2}$ and disables the antenna module 2110B. As a result, the communication quality of the wireless communication device 200 degrades from high quality to medium quality. In addition, the temperature Ta of the antenna module 2110A rises.

Here, as illustrated in FIG. 11, the wireless communication device 200 disables the antenna module 2110B at the time point t21, and thus, thereafter, the temperature Tb of the antenna module 2110B drops faster than in a case where use of the antenna module 2110B is stopped. In FIG. 11, the temperature drops to the third temperature threshold $Th_{t3}$ at a time point t22, and thus, the wireless communication device 200 switches the antenna module which is being used from the antenna module 2110A to the antenna module 2110B at the time point t22. As a result, the communication quality of the wireless communication device 200 increases from medium quality to high quality. In addition, the temperature Tb of the antenna module 2110B rises.

Next, the wireless communication device 200 switches the antenna module which is being used from the antenna module 2110B to the antenna module 2110A at a time point t23 when the temperature Tb of the antenna module 2110B becomes equal to or higher than the second temperature threshold $Th_{t2}$ and disables the antenna module 2110B. As a result, the communication quality of the wireless communication device 200 degrades from high quality to medium quality. In addition, the temperature Ta of the antenna module 2110A rises.

The wireless communication device 200 switches the antenna module which is being used from the antenna module 2110A to another antenna module 2110 (in FIG. 11, the antenna module 2110E is selected) at a time point 24 when the temperature Ta of the antenna module 2110A becomes equal to or higher than the second temperature threshold $Th_{t2}$ and disables the antenna module 2110A. As a result, the communication quality of the wireless communication device 200 degrades from medium quality to low quality.

Here, the wireless communication device 200 switches the antenna module which is being used from the antenna module 2110E to the antenna module 2110B at a time point t25 when the temperature Tb of the antenna module 2110B becomes less than the third temperature threshold $Th_{t3}$ and disables the antenna module 2110E. As a result, the communication quality of the wireless communication device 200 increases from low quality to high quality.

In addition, the wireless communication device 200 switches the antenna module which is being used from the antenna module 2110B to the antenna module 2110A at a time point t26 when the temperature Tb of the antenna module 2110B becomes equal to or higher than the second temperature threshold $Th_{t2}$ and disables the antenna module 2110B. As a result, the communication quality of the wireless communication device 200 degrades from high quality to medium quality.

As described above, in the present modification, the wireless communication device 200 disables the antenna module 2110 whose temperature is the second temperature threshold $Th_{t2}$. As a result, the temperature of the disabled antenna module 2110 drops faster, so that use of the antenna module 2110 can be resumed sooner, and the high-quality antenna module 2110 can be used for a longer period of time. Furthermore, the period of use of the low-quality antenna module 2110 can be shortened. As a result, the communication quality of the wireless communication device 200 can be maintained for a longer period of time.

2.5.2. Modification 2

Next, Modification 2 of the first embodiment will be described. In the first embodiment described above, the antenna module 2110 whose temperature is equal to or higher than the second temperature threshold $Th_{t2}$ is excluded from the antenna module candidates regardless of the communication quality. In this case, if the communication quality of the remaining antenna module candidates is low, the communication quality after the antenna module to be used is switched may degrade, and the user's perceived throughput may be lowered.

Thus, in the present modification, in a case where the communication quality of the antenna module candidates is lower than a predetermined threshold, even the antenna module 2110 having a temperature equal to or higher than the second temperature threshold $Th_{t2}$ is set as a candidate for the antenna module to be used. As a result, the communication quality of the wireless communication device 200 can be maintained at equal to or higher than a predetermined threshold.

More specifically, the antenna selection unit 263 of the wireless communication device 200 acquires information regarding the communication quality of all the antenna modules 2110 set as the antenna module candidates. In a case where the acquired communication quality is lower than a quality threshold Thq1, the antenna selection unit 263 sets the antenna module 2110 whose temperature is equal to or higher than the second temperature threshold $Th_{t2}$ and lower than the first temperature threshold $Th_{t1}$ as the antenna module candidate. The wireless communication device 200 selects, for example, the antenna module 2110 having the highest communication quality as the antenna module to be used from the antenna module candidates.

Figure 12:
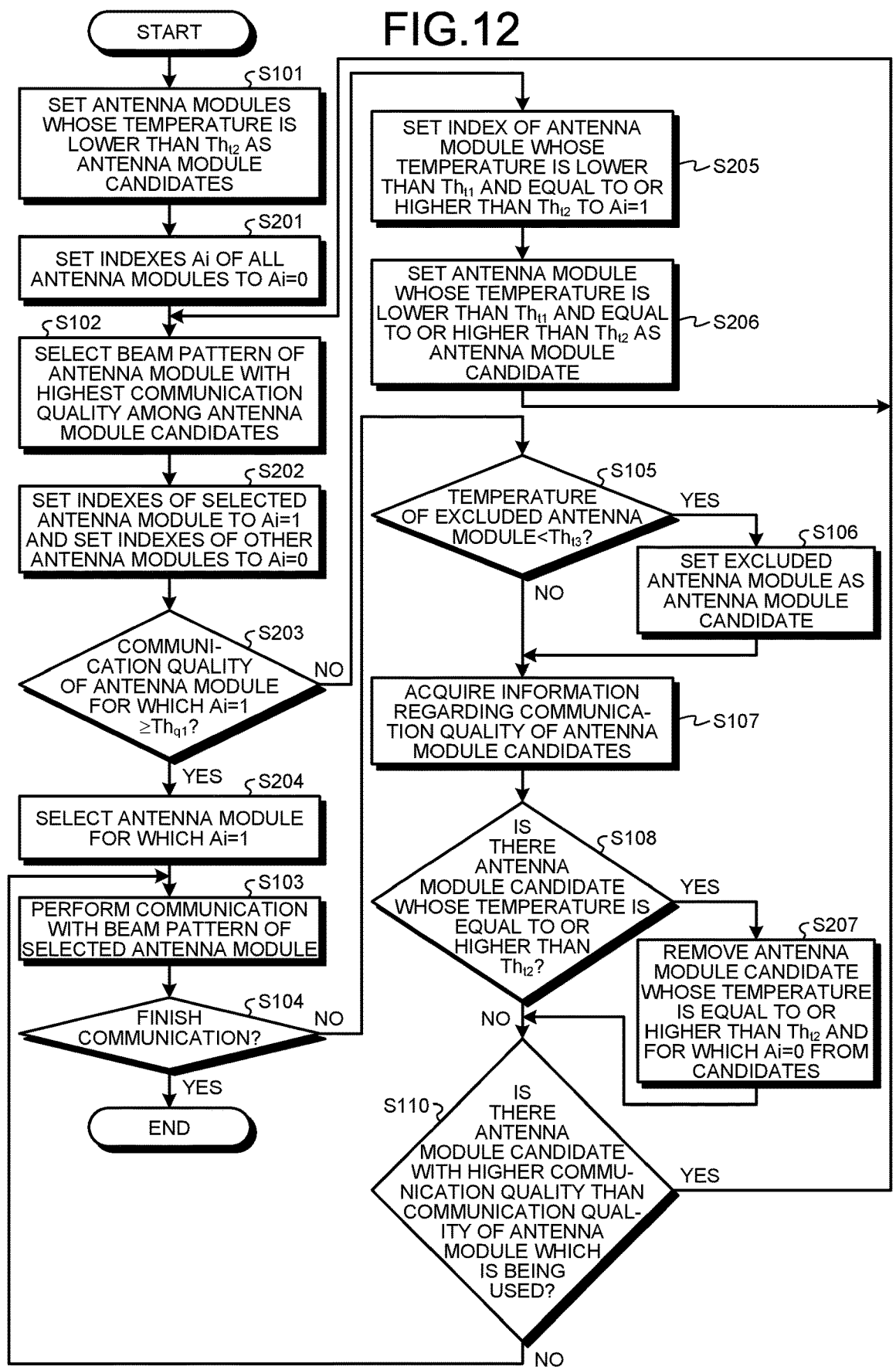
FIG. 12 is a flowchart illustrating an example of flow of antenna selection processing to be executed at the wireless communication device according to Modification 2 of the present disclosure.

Details of the antenna selection processing by the wireless communication device 200 will be described with reference to FIG. 12. FIG. 12 is a flowchart illustrating an example of flow of antenna selection processing to be executed at the wireless communication device 200 according to Modification 2 of the present disclosure. The same reference numerals will be assigned to processing which is the same as the antenna selection processing illustrated in FIG. 10, and the description thereof will be omitted.

As illustrated in FIG. 12, if the antenna module candidates are set in Step S101, the wireless communication device 200 sets an index Ai (i=0, 1, 2, . . . ) of all the antenna modules 2110 to zero (Ai=0). (Step S201). The indexes A0, A1, A2, . . . respectively correspond to the antenna modules 2110A, 2110B, 2110C.

Subsequently, the wireless communication device 200 sets the index Ai of the antenna module 2110 of the beam pattern selected in Step S102 to 1 (Ai=1) (Step S202). As a result, the index Ai of the selected antenna module 2110 becomes Ai=1, and the index Ai of other antenna module candidates becomes Ai=0.

Next, the wireless communication device 200 determines whether or not the communication quality of the antenna module 2110 having the index Ai=1 is equal to or higher than the quality threshold Thq1 (Step S203).

In a case where the communication quality is equal to or higher than the quality threshold Thq1 (Step S203: Yes), the wireless communication device 200 selects the antenna module 2110 having the index Ai=1, that is, having communication quality equal to or higher the quality threshold Thq1 as the antenna module to be used for communication (Step S204), and the processing proceeds to Step S103.

On the other hand, in a case where the communication quality of the antenna module 2110 having the index Ai=1 is lower than the quality threshold Thq1 (Step S203: No), the wireless communication device 200 sets the index Ai of the antenna module 2110 whose temperature is lower than the first temperature threshold $Th_{t1}$ and is equal to or higher than the second temperature threshold $Th_{r2}$ to Ai=1 (Step S205). Further, the wireless communication device 200 sets the antenna module 2110 whose temperature is lower than the first temperature threshold $Th_{r1}$ and equal to or higher than the second temperature threshold $Th_{r2}$ as the antenna module candidate (Step S206), and the processing returns to Step S102.

In addition, in Step S108, in a case where the wireless communication device 200 determines that there is an antenna module candidate whose temperature is equal to or higher than the second temperature threshold $Th_{r2}$ (Step S108: Yes), the wireless communication device 200 excludes the antenna module candidate having the index Ai=0 whose temperature is equal to or higher than the second temperature threshold $Th_{r2}$ from antenna selection candidates and sets the antenna module as the excluded antenna module (Step S207), and the processing proceeds to Step S110.

As described above, in the present modification, in a case where the communication quality of the antenna module candidate whose temperature is lower than the second temperature threshold $Th_{r2}$ is lower than the quality threshold Thq1, the wireless communication device 200 sets the antenna module 2110 whose temperature is equal to or higher than the second temperature threshold $Th_{r2}$ and lower than the first temperature threshold $Th_{r1}$, as the antenna module candidate. As a result, the wireless communication device 200 can perform communication with communication quality equal to or higher than the quality threshold Thq1.

Note that there can be a case where the communication quality of the antenna module 2110 whose temperature is equal to or higher than the second temperature threshold $Th_{r2}$ and lower than the first temperature threshold $Th_{r1}$ is lower than the quality threshold Thq1. In this case, the wireless communication device 200 may select, for example, the antenna module 2110 having the highest communication quality among the antenna modules 2110 whose temperatures are lower than the first temperature threshold $Th_{r1}$ as the antenna module to be used. As a result, the wireless communication device 200 can maintain communication with the base station 100 while preventing degradation of the communication quality.

3. Second Embodiment

Subsequently, a second embodiment of the present disclosure will be described. In the second embodiment, in a case where the wireless communication device 200 determines to switch the antenna module which is being used, for example, the wireless communication device 200 outputs information for changing a position of the wireless communication device 200. Specifically, for example, in a case where the temperature of the antenna module which is being used is equal to or higher than the second temperature threshold $Th_{r2}$, the wireless communication device 200 notifies the user of notification information instructing posture change of the wireless communication device 200.

As a result, the user can change the posture of the wireless communication device 200. If the posture of the wireless communication device 200 is changed, the communication quality of the antenna module 2110 changes. If the communication quality of the antenna module 2110 changes, a possibility that the wireless communication device 200 can select the antenna module 2110 whose temperature is lower than the second temperature threshold $Th_{r2}$ and which has higher communication quality increases in a case where the wireless communication device 200 switches the antenna module which is being used.

Note that the wireless communication device 200 may, for example, notify the user of notification information instructing posture change so that the communication quality of the antenna module 2110 whose temperature is lower than the second temperature threshold $Th_{r2}$ becomes higher. As a result, the wireless communication device 200 can more reliably select the antenna module 2110 whose temperature is lower than the second temperature threshold $Th_{r2}$ and which has higher communication quality.

3.1. Functional Configuration Example

Figure 13:
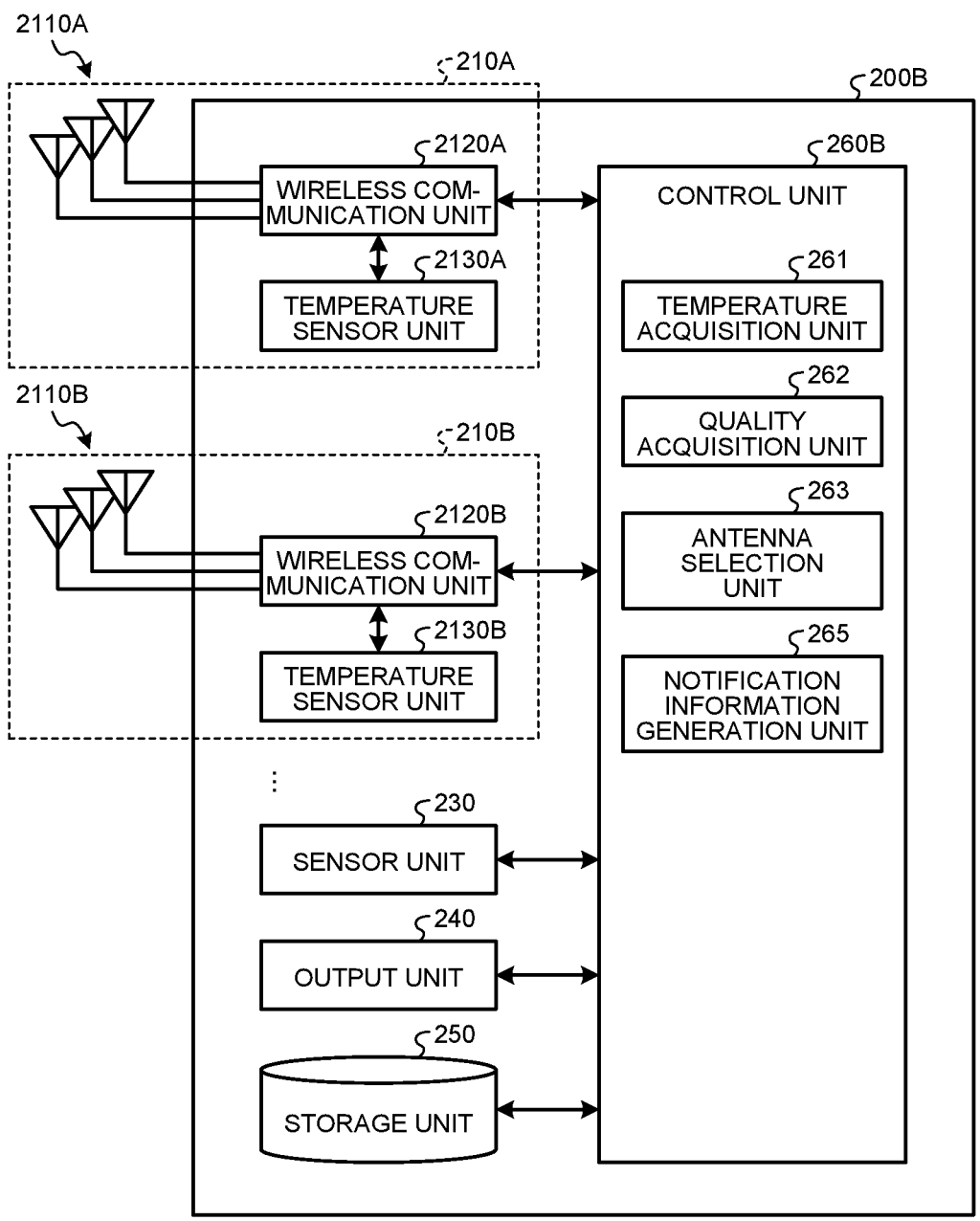
FIG. 13 is a block diagram illustrating an example of a configuration of a wireless communication device according to a second embodiment of the present disclosure.

FIG. 13 is a block diagram illustrating an example of a configuration of a wireless communication device 200 according to the second embodiment of the present disclosure. The wireless communication device 200 illustrated in FIG. 13 includes a sensor unit 230 in addition to the respective components of the wireless communication device 200 illustrated in FIG. 5. Further, the control unit 260 of the wireless communication device 200 illustrated in FIG. 13 includes a notification information generation unit 265 in addition to the respective components of the control unit 260 illustrated in FIG. 5.

Sensor Unit 230

The sensor unit 230 detects various kinds of information regarding the wireless communication device 200.

The sensor unit 230 has a function as a posture information acquisition unit that acquires posture information of the wireless communication device 200. The posture information acquisition unit calculates and acquires posture information indicating the posture of the wireless communication device 200 on the basis of, for example, acceleration detected by an acceleration sensor, angular velocity detected by a gyro sensor, and geomagnetism detected by a geomagnetic sensor.

The sensor unit 230 has a function as a position information acquisition unit that acquires position information of the wireless communication device 200. The position information acquisition unit receives, for example, a global navigation satellite system (GNSS) signal from a GNSS satellite (for example, a GPS signal from a global positioning system (GPS) satellite) and detects position information including latitude and longitude of the device and outputs the detected position information. The position information acquisition unit may detect the position information by using any other technique. For example, the position information acquisition unit may detect position information through Wi-Fi (registered trademark), transmission and reception with a mobile phone, a PHS, a smartphone, or the like, or short-range communication, or the like. Further, the position information of the wireless communication device 200 may include altitude of the wireless communication device 200. The altitude of the wireless communication device 200 is acquired on the basis of, for example, a barometric pressure detected by a barometric pressure sensor. In other words, the position information is concept that includes not only a position in a horizontal direction but also a position in a height direction.

Notification Information Generation Unit 265

The notification information generation unit 265 generates notification information for changing a position of the chassis of the wireless communication device 200, that is, the chassis on which the antenna module 2110 is mounted. The notification information generation unit 265 presents the generated notification information to the user via, for example, the output unit 240.

The notification information is information for instructing the user, for example, to change posture of the chassis. Such information may be, for example, image information or speech information (including not only speech but also music, beep sound, and the like). Alternatively, the notification information may be information regarding lighting color and a blinking pattern of light of a light emitting device.

Figure 14:
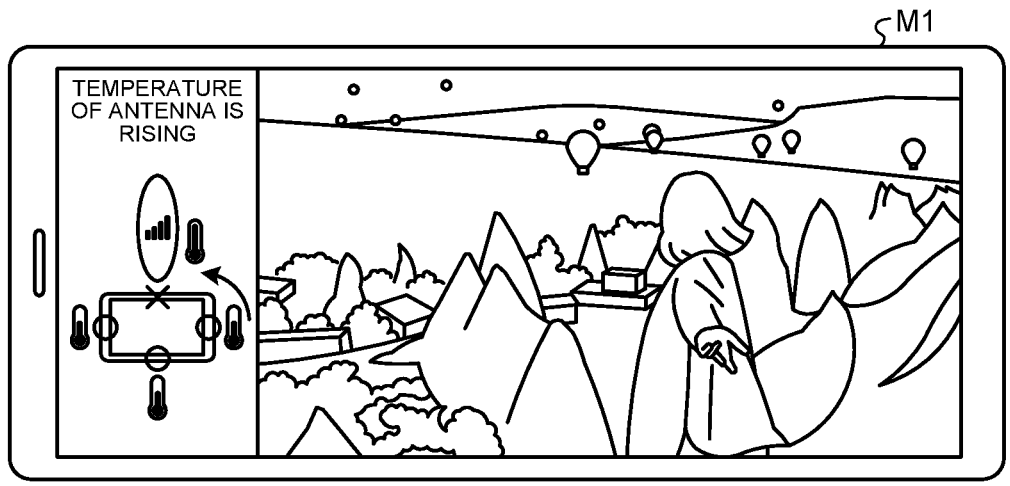
FIG. 14 is a view illustrating an example of notification information to be generated by a notification information generation unit.

An example of the notification information generated by the notification information generation unit 265 will be described with reference to FIG. 14 to FIG. 16. FIG. 14 is a view illustrating an example of the notification information generated by the notification information generation unit 265. In the example of FIG. 14, the notification information generation unit 265 generates image information M1 as the notification information.

The notification information generation unit 265 generates image information M1 for displaying, for example, the position of the antenna module 2110 whose temperature has risen together with an image of a thermometer. In addition, the notification information generation unit 265 generates notification information for displaying an arrow indicating rotation of the orientation of the wireless communication device 200, together with the sentence of "the temperature of the antenna is rising". As a result, the notification information generation unit 265 can instruct the user to rotate the posture of the wireless communication device 200.

Figure 15:
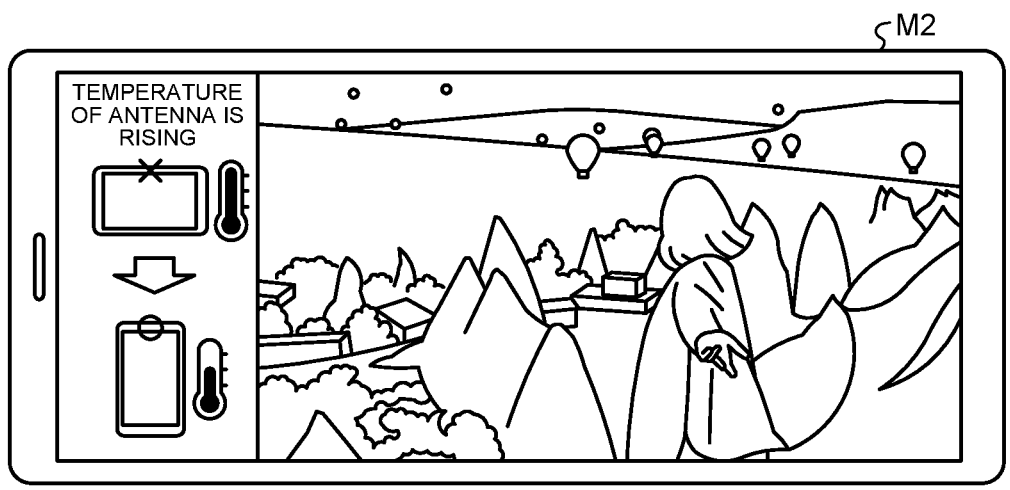
FIG. 15 is a view illustrating an example of notification information to be generated by a notification information generation unit.

As illustrated in FIG. 15, instead of the arrow in FIG. 14, the notification information generation unit 265 may generate image information M2 including an image indicating the orientation of the wireless communication device 200 before rotation and an image indicating the orientation of the wireless communication device 200 after rotation. In this way, the notification information generation unit 265 can instruct the user to rotate the posture of the wireless communication device 200 by presenting to the user, the image before and after change of the posture. Note that FIG. 15 is a view illustrating an example of the notification information generated by the notification information generation unit 265.

Figure 16:
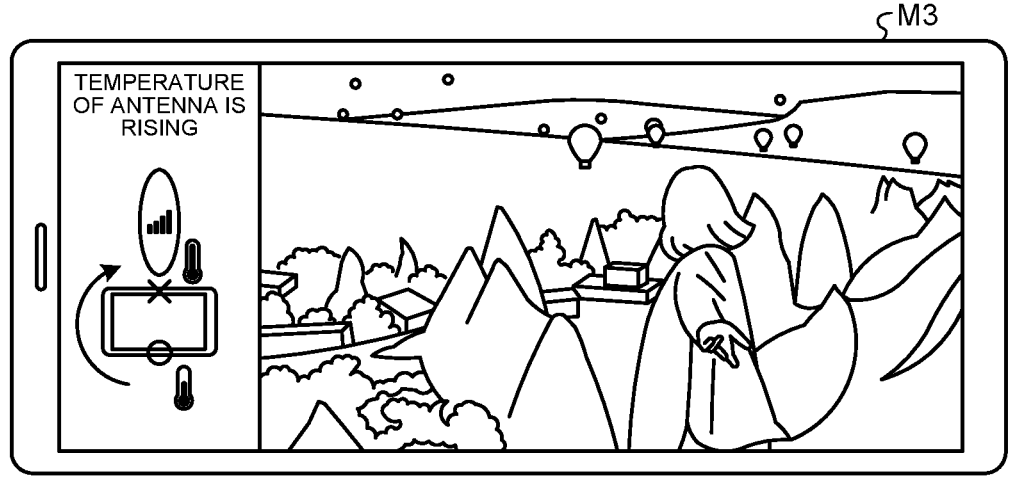
FIG. 16 is a view illustrating an example of notification information to be generated by a notification information generation unit.

FIG. 16 is a view illustrating an example of notification information to be generated by a notification information generation unit 265. In the example of FIG. 16, the notification information generation unit 265 generates image information M3 as the notification information.

The image information M1 illustrated in FIG. 14 includes an arrow that rotates the wireless communication device 200 by 90 degrees, while the image information M3 illustrated in FIG. 16 includes an arrow that rotates the wireless communication device 200 by 180 degrees. For example, in a case where a moving image is viewed while a smartphone is turned sideways, there is a case where a display screen of the moving image becomes small if the smartphone is rotated by 90 degrees. Even in such a case, by the notification information generation unit 265 instructing the user to rotate the wireless communication device 200 by 180 degrees, it is possible to instruct the user to change the posture of the wireless communication device 200 while, for example, preventing viewing of the moving image from being hindered.

The posture of the wireless communication device 200 after the change presented by the notification information generation unit 265 to the user is not limited to the above-described example. For example, the notification information generation unit 265 may generate the notification information so that the predetermined antenna module 2110 is more likely to be selected as the antenna module to be used.

For example, the notification information generation unit 265 may generate the notification information instructing posture change of the wireless communication device 200 so that the antenna module 2110 having the lowest temperature comes to a position of the antenna module to be used.

Alternatively, the notification information generation unit 265 may generate the notification information instructing posture change of the wireless communication device 200 so that the antenna module 2110 farthest from the antenna module which is being used comes to the position of the antenna module to be used.

Figure 17:
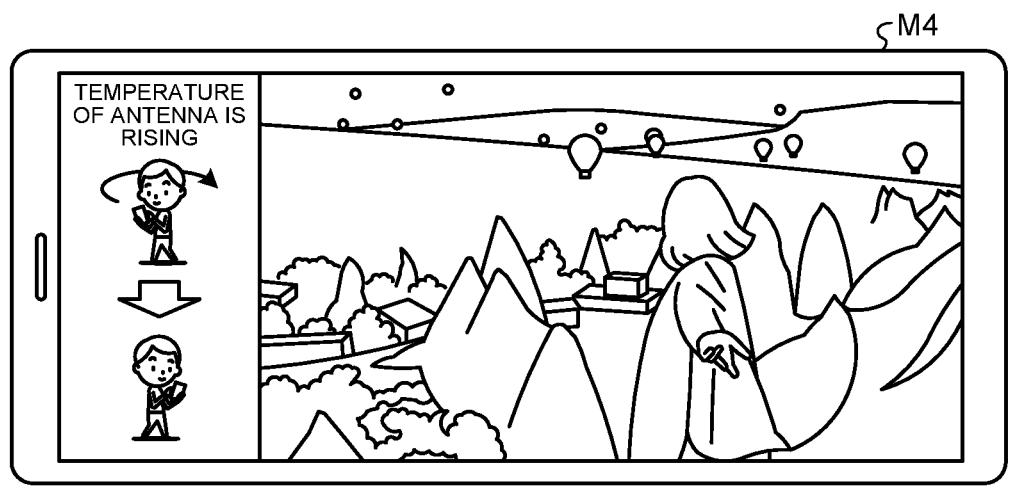
FIG. 17 is a view illustrating an example of notification information to be generated by a notification information generation unit.

Further, the notification information generated by the notification information generation unit 265 is not limited to the information instructing the change of the posture of the wireless communication device 200. For example, as illustrated in FIG. 17, the notification information may be image information M4 instructing movement of the wireless communication device 200. Note that FIG. 17 is a view illustrating an example of the notification information generated by the notification information generation unit 265.

There is a case where, for example, radio waves shielded by the user can reach the wireless communication device 200 by the user moving the wireless communication device 200. Thus, by causing the user to move the wireless communication device 200, the communication quality of the antenna module 2110 changes, so that the wireless communication device 200 is more likely to be able to select the antenna module 2110 whose temperature is lower than the second temperature threshold $Th_{t2}$ and which has higher communication quality as the antenna to be used for communication.

Note that here, the notification information generation unit 265 generates, for example, image information M4 instructing the user to change a direction as information instructing movement of the wireless communication device 200. In this way, by instructing the user to change a direction, it is possible to instruct the user to move the wireless communication device 200. Alternatively, the notification information generation unit 265 may generate the notification information instructing the user to move. In this way, by presenting the notification information instructing change of the direction or movement to the user, it is possible to instruct the user to move the wireless communication device 200.

Figure 18:
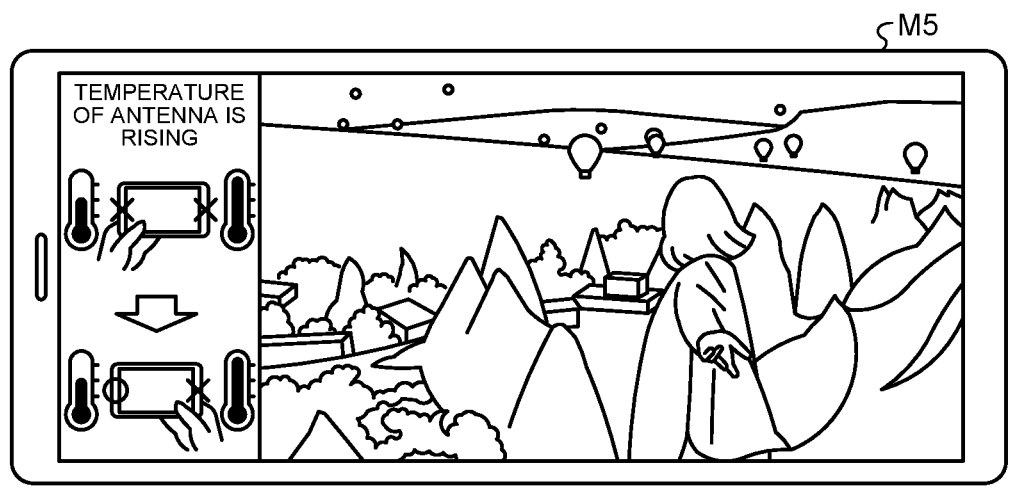
FIG. 18 is a view illustrating an example of notification information to be generated by a notification information generation unit.

Alternatively, as illustrated in FIG. 18, the notification information may be, for example, image information M5 instructing change the way of holding the wireless communication device 200. Note that FIG. 18 is a view illustrating an example of the notification information generated by the notification information generation unit 265.

There is a case where the communication quality of the antenna module 2110 may degrade as a result of the user's hand covering the antenna module 2110. Thus, by instructing the user to change the way of holding the wireless communication device 200, the antenna module 2110, which could not be used for communication until then, is more likely to be able to be used for communication.

In this way, by the notification information generation unit 265 generating the notification information instructing change of the position/posture of the wireless communication device 200 or the way of holding the wireless communication device 200, the communication quality of the wireless communication device 200 can be maintained for a longer period of time.

3.2. Antenna Selection Processing

Figure 19:
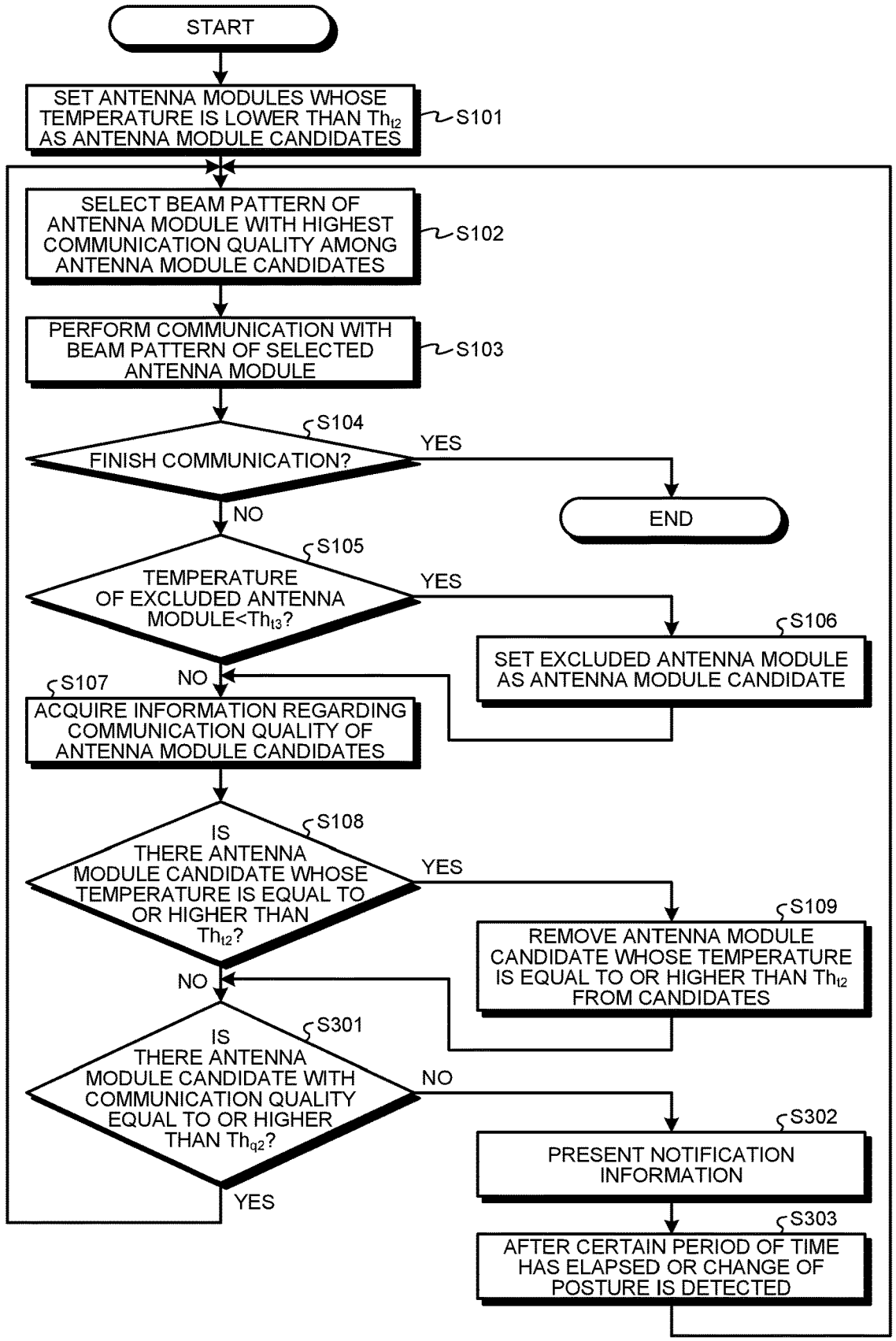
FIG. 19 is a flowchart illustrating an example of flow of antenna selection processing to be executed at the wireless communication device according to the second embodiment of the present disclosure.

FIG. 19 is a flowchart illustrating an example of flow of antenna selection processing to be executed at the wireless communication device 200 according to the second embodiment of the present disclosure. The same reference numerals will be assigned to processing which is the same as the antenna selection processing illustrated in FIG. 10, and the description thereof will be omitted.

As illustrated in FIG. 19, in a case where there is no antenna module candidate whose temperature is equal to or higher than the second temperature threshold $Th_{t2}$ (Step S108: No), the wireless communication device 200 determines whether or not there is an antenna module candidate whose communication quality is equal to or higher than the second quality threshold Thq2 (Step S301).

In a case where there is an antenna module candidate having communication quality equal to or higher than the second quality threshold Thq2 (Step S301: Yes), the processing returns to Step S102, and the wireless communication device 200 selects a beam pattern of the antenna module candidate to be used for communication.

On the other hand, in a case where there is no antenna module candidate whose communication quality is equal to or higher than the second quality threshold Thq2 (Step S301: No), the wireless communication device 200 presents the notification information to the user (Step S302). For example, the notification information generation unit 265 generates image information and outputs the image information to the output unit 240 to present the notification information to the user.

Then, after a certain period of time has elapsed since the wireless communication device 200 had presented the notification information to the user or in a case where change of the posture of the wireless communication device 200 is detected (Step S303), the processing returns to Step S102.

The change of the posture of the wireless communication device 200 is detected in Step S303 on the basis of, for example, the sensor unit 230. Alternatively, the wireless communication device 200 may detect change of the position of the user's hand or change of the position of the wireless communication device 200 on the basis of the detection result of the sensor unit 230.

Further, the wireless communication device 200 may measure communication quality at a predetermined cycle for each beam pattern of the antenna module candidate and may detect the change of the communication quality. In this case, in a case where there is an antenna module candidate whose communication quality is equal to or higher than the predetermined quality threshold, it is assumed that change of communication quality is detected, and the processing of the wireless communication device 200 proceeds to Step S102.

Note that while in the second embodiment described above, the notification information generation unit 265 generates the notification information instructing the user to change the position/posture or the way of holding, the present disclosure is not limited to this. For example, in a case where the wireless communication device 200 is a device having a movable portion, for example, the notification information generation unit 265 may generate the notification information instructing the user to change a state of the movable portion. The wireless communication device 200 having a movable portion includes, for example, a foldable wireless communication device. Alternatively, the wireless communication device 200 having a movable portion may be a slidable wireless communication device. The state of the movable portion can be detected by using, for example, a magnetic sensor of the sensor unit 230.

Further, while in the second embodiment described above, a case has been described where the user changes the position/posture of the wireless communication device 200, the present disclosure is not limited to this. For example, in a case where the wireless communication device 200 is a movable device, the control unit 260 may control the wireless communication device 200 so as to change the position/posture. Examples of the movable wireless communication device 200 can include a drone and a vehicle capable of autonomous driving.

Further, while in the second embodiment described above, the notification information generation unit 265 presents the notification information via the output unit 240 (display unit) of the wireless communication device 200, the present disclosure is not limited to this. For example, in a case where the wireless communication device 200 is a device that does not have a display unit, the wireless communication device 200 can present the notification information to the user by outputting the notification information to an external display device connected to the wireless communication device 200 in a wired or wireless manner.

While a case has been described where an illustration indicating the posture of the wireless communication device 200, the position of the user's hand, and instructing the user to move, and the like, are displayed in the above-described image information M1 to M5, the present disclosure is not limited to this. For example, the wireless communication device 200 may display an image captured by the camera on the display unit and display an illustration of a moving direction, and the like, which is superimposed on the image to notify the user of the notification information. In this way, the wireless communication device 200 may display the notification information in AR to notify the user of the notification information.

4. Third Embodiment

4.1. Functional Configuration Example

Figure 20:
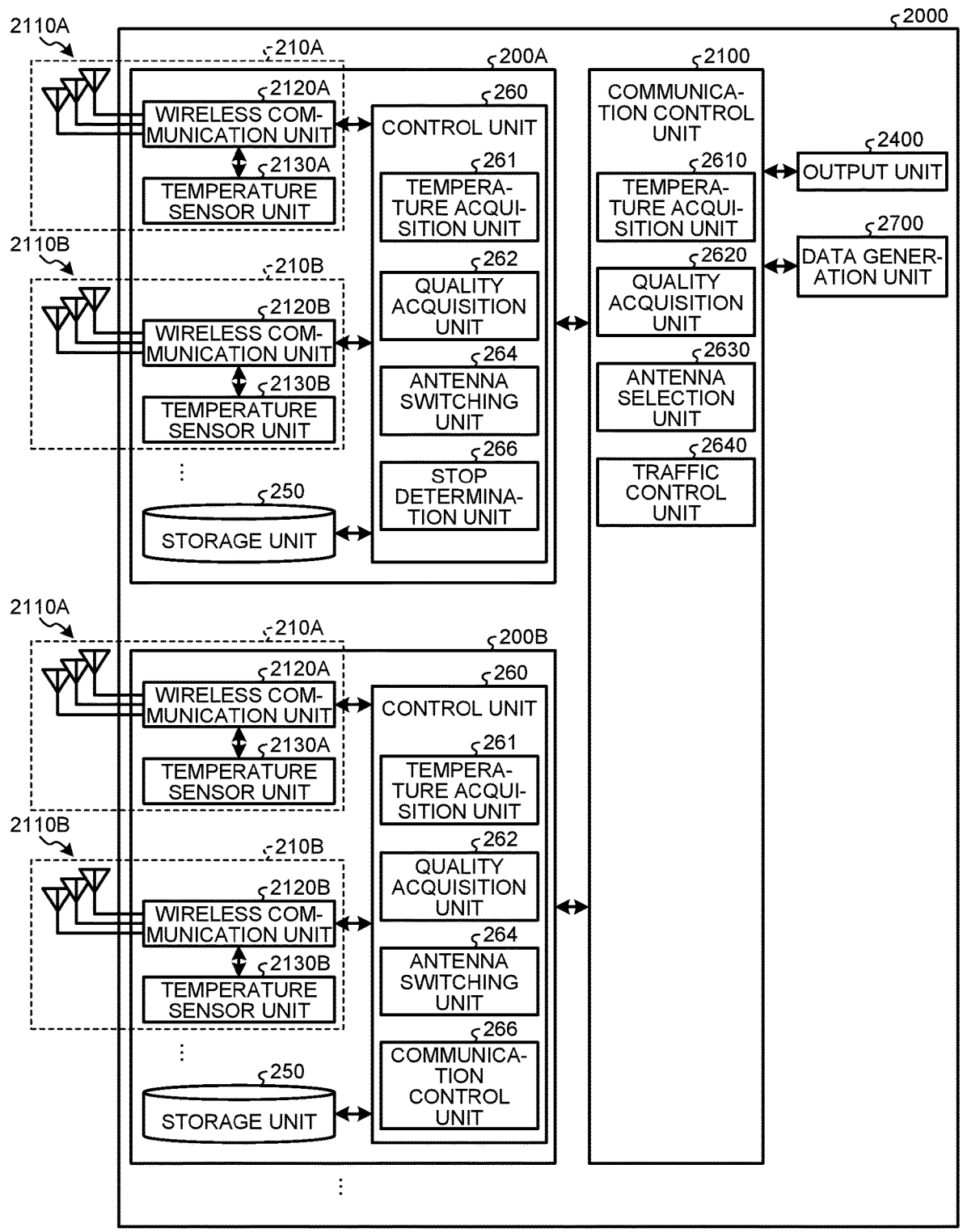
FIG. 20 is a block diagram illustrating an example of a configuration of a terminal device according to a third embodiment of the present disclosure.

FIG. 20 is a block diagram illustrating an example of a configuration of a terminal device 2000 according to a third embodiment of the present disclosure. A terminal device 2000 includes a plurality of wireless communication devices 200A, 200B . . . , a communication control unit 2100, an output unit 2400, and a data generation unit 2700.

The wireless communication device 200 does not include the output unit 240 illustrated in FIG. 5 and includes a stop determination unit 266 instead of the antenna selection unit 263. The stop determination unit 266 stops using the antenna module 2110 in a case where the temperature of the antenna module 2110 is equal to or higher than the first temperature threshold $Th_{t1}$. The stop determination unit 266 notifies the communication control unit 2100 of information regarding the antenna module 2110 which the wireless communication device 200 has stopped using.

Further, one wireless communication device 200 has a plurality of antenna modules 2110 having different directivities, as in the first embodiment. It is assumed that the wireless communication device 200 includes, for example, an antenna module 2110 having a directivity in a direction similar to a direction of the antenna module 2110 of a different wireless communication device 200. Note that here, the similar direction means that the directivity of two antenna modules 2110 is within a predetermined range.

For example, it is assumed that a direction of a beam that can be formed by the antenna module 2110A of the wireless communication device 200A may be similar to a direction of a beam that can be formed by the antenna module 2110B of the wireless communication device 200B.

There may be an antenna module 2110 that does not form a beam in a direction similar to directions of other antenna modules 2110. In other words, there may be an antenna module that has only directivity in a direction completely different from directions of other antenna modules. Alternatively, there may be a plurality of antenna modules capable of forming a beam in a direction similar to a direction of one antenna module 2110. As described above, it is only necessary to provide at least one antenna module capable of forming a beam in a similar direction for at least one antenna module.

Further, it is assumed that the plurality of wireless communication devices 200A, 200B, . . . performs communication in accordance with the same wireless communication scheme. For example, it is assumed that the plurality of wireless communication devices 200A, 200B, . . . uses a 5G-NR line to transmit and receive data signals in the first frequency band. As described above, the plurality of wireless communication devices 200A, 200B . . . can transmit and communicate radio signals, and can transmit data in a redundant manner as will be described later.

The output unit 2400 outputs information to the user. For example, the output unit 2400 includes a display device such as a display, a light emitting device such as a light emitting diode (LED), a sound output device such as a speaker, or a vibration device such as an eccentric motor. Then, the output unit 2400 outputs an image (still image/moving image), light, sound, or vibration.

The data generation unit 2700 generates data for communication via the wireless communication device 200. The data generation unit 2700 generates, for example, an image captured by a camera, data related to an application, and the like.

The communication control unit 2100 functions as an arithmetic processing unit and a control device and controls overall operation in the terminal device 2000 according to various kinds of programs. The communication control unit 2100 is implemented by an electronic circuit such as a central processing unit (CPU) and a microprocessor. The communication control unit 2100 may include a read only memory (ROM) for storing programs to be used, operation parameters, and the like, and a random access memory (RAM) for temporarily storing parameters, and the like, that change as appropriate.

The communication control unit 2100 includes a temperature acquisition unit 2610, a quality acquisition unit 2620, an antenna selection unit 2630, and a traffic control unit 2640.

The temperature acquisition unit 2610 acquires the temperature of the antenna module 2110 of the wireless communication devices 200 from each of the wireless communication devices 200. The quality acquisition unit 2620 has a function of controlling entire processing related to measurement of communication quality accompanied by beam sweeping and acquires information regarding communication quality for each beam pattern of the antenna module 2110 of the wireless communication devices 200 by measuring the communication quality.

The antenna selection unit 2630 has a function of controlling the antenna selection processing on the basis of the acquisition results of the temperature acquisition unit 2610 and the quality acquisition unit 2620. The traffic control unit 2640 duplicates or makes traffic to and from the base station 100 redundant in order to improve reliability in accordance with a traffic amount, QoS information, and a propagation environment. Further, the traffic control unit 2640 uses a plurality of wireless communication devices 200 to perform parallel transmission of data in order to improve throughput. Details of operation of the antenna selection unit 2630 and the traffic control unit 2640 will be described in detail later.

4.2. Antenna Selection Processing

Figure 21:
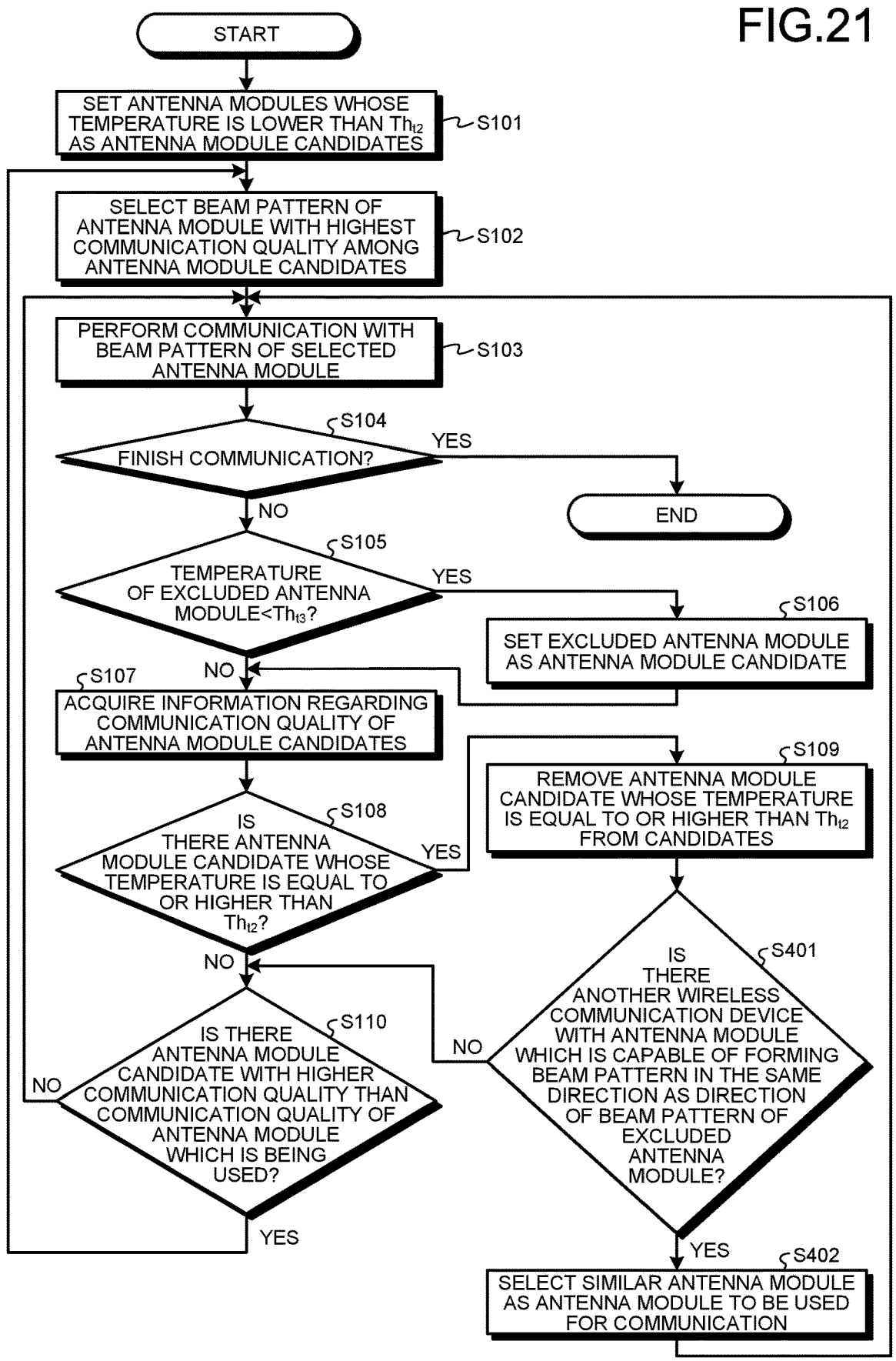
FIG. 21 is a flowchart illustrating an example of flow of antenna selection processing to be executed at the terminal device according to the third embodiment of the present disclosure.

FIG. 21 is a flowchart illustrating an example of flow of antenna selection processing to be executed at the terminal device 2000 according to the third embodiment of the present disclosure. The antenna selection processing is mainly executed by the antenna selection unit 2630 of the terminal device 2000. Further, the antenna selection processing is repeatedly executed, for example, from when communication of the terminal device 2000 is started until the communication ends.

The antenna selection processing according to the third embodiment of the present disclosure is basically processing of selecting an antenna module 2110 to be used for communication among a plurality of antenna modules 2110 possessed by the wireless communication device 200 selected to be used for communication by the terminal device 2000. Thus, the same reference numerals will be assigned to processing which is the same as the antenna selection processing illustrated in FIG. 10, and description thereof will be omitted.

As illustrated in FIG. 21, in Step S109, the terminal device 2000 sets the antenna module candidate whose temperature is equal to or higher than the second temperature threshold $Th_{t2}$ as the excluded antenna module. Next, the terminal device 2000 determines whether or not there is another wireless communication device 200 having an antenna module capable of forming a beam pattern in a direction similar to a direction of the excluded antenna module (Step S401).

Here, the other wireless communication device is a wireless communication device 200 other than the wireless communication device 200 to be used for communication and refers to a wireless communication device 200 that is not used for other communication.

Further, the terminal device 2000 sets, for example, an antenna module which is capable of forming a beam pattern in a direction similar to a direction of the excluded antenna module, and whose temperature is lower than the second temperature threshold $Th_{t2}$ as a similar antenna module.

In other words, the terminal device 2000 sets, for example, an antenna module which is unused, whose temperature is lower than the second temperature threshold $Th_{t2}$, and which is capable of forming a beam pattern in a direction similar to a direction of the excluded antenna module as the similar antenna module.

In a case where there is no other wireless communication device 200 having a similar antenna module capable of forming a beam pattern in a direction similar to a direction of the excluded antenna module (Step S401: No), the processing proceeds to Step S110.

On the other hand, in a case where there is another wireless communication device 200 having a similar antenna module capable of forming a beam pattern in a similar direction to a direction of the excluded antenna module (Step S401: Yes), the terminal device 2000 selects the similar antenna module as the antenna module 2110 to be used for communication (Step S402), and the processing proceed to Step S103. In other words, the terminal device 2000 switches the wireless communication device 200 for communication to another wireless communication device 200.

More specifically, the terminal device 2000 switches the antenna module which is being used to a similar antenna module of another wireless communication device 200, selects a beam pattern having the highest communication quality from beam patterns that can be formed by the similar antenna module and performs communication.

Note that while it is assumed here that the terminal device 2000 executes the antenna selection processing, the present disclosure is not limited to this. For example, the wireless communication device 200 that is performing communication may perform the antenna selection processing.

In this case, for example, the wireless communication device 200 inquires as to whether or not there is another wireless communication device 200 having a similar antenna module to the communication control unit 2100 of the terminal device 2000 in Step S401.

In a case where there is no other wireless communication device 200 having a similar antenna module, the processing proceeds to Step S110, and the wireless communication device 200 which is performing communication selects an antenna module to be used among the antenna modules 2110 owned by the wireless communication device 200.

On the other hand, in a case where there is another wireless communication device 200 having a similar antenna module, the wireless communication device 200 which is performing communication finishes the communication. Further, the terminal device 2000 instructs the other wireless communication device 200 having the similar antenna module to start communication using the similar antenna module.

4.3. Traffic Control Processing

Figure 22:
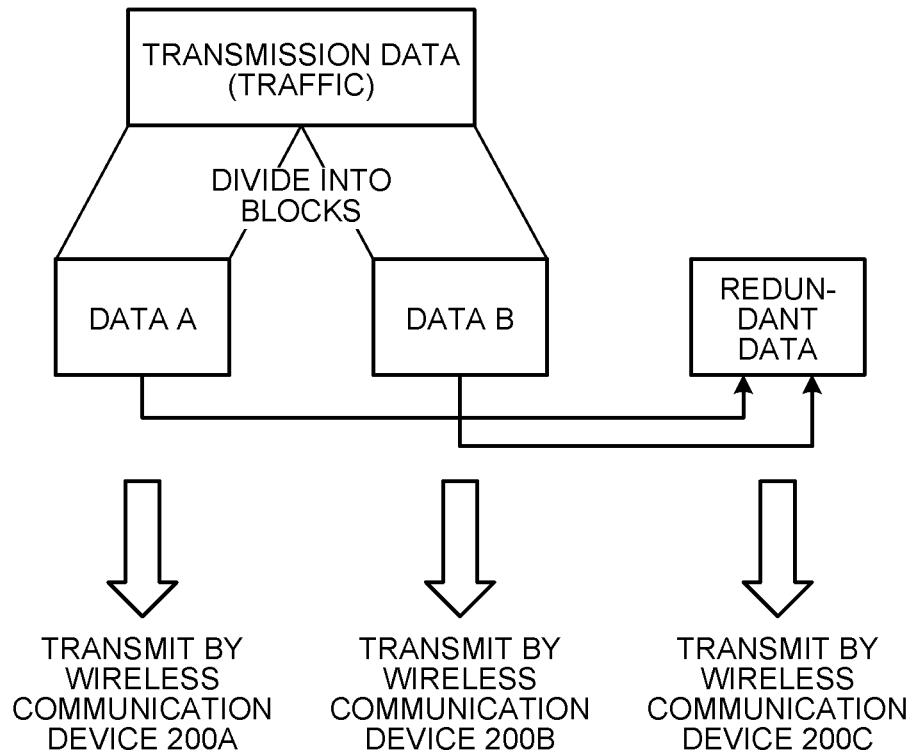
FIG. 22 is a view for explaining traffic control processing according to the second embodiment of the present disclosure.

Here, traffic control processing to be performed by the terminal device 2000 will be described with reference to FIG. 22. FIG. 22 is a view for explaining traffic control processing according to the second embodiment of the present disclosure. The traffic control processing is mainly performed by the traffic control unit 2640 of the terminal device 2000.

The terminal device 2000 makes data redundant and performs parallel transmission during data transmission to achieve improvement in reliability and throughput. First, processing of making data redundant will be described with reference to FIG. 22.

As illustrated in FIG. 22, the traffic control unit 2640 divides transmission data (traffic) generated by the data generation unit 2700 into two blocks, data A and data B. Further, the traffic control unit 2640 generates redundant data using the blocked data A and B.

The redundant data can be generated on the basis of the data A and the data B through processing related to any method that can implement error correction, such as using, for example, an error correction code or using an exclusive OR at a bit level of a plurality of pieces of data. In this way, the traffic control unit 2640 makes the transmission data redundant by generating redundant data from the transmission data.

In this way, by the traffic control unit 2640 making the transmission data redundant, for example, even if one of the data A and the data B is not correctly received on a receiving side, the data which has failed in reception can be restored using the redundant data and the other data which are correctly received. In this way, the traffic control unit 2640 makes the transmission data redundant, so that reliability of communication can be improved.

If the traffic control unit 2640 transmits transmission data which is made redundant (data A, B, redundant data) using one wireless communication device 200, time required for transmission becomes longer by an amount corresponding to the redundant data, which may degrade throughput.

Thus, the traffic control unit 2640 transmits the transmission data which is made redundant using different wireless communication devices 200. For example, in FIG. 22, the traffic control unit 2640 controls the wireless communication device 200 so that the data A is transmitted by the wireless communication device 200A and the data B is transmitted by the wireless communication device 200B. Then, the traffic control unit 2640 transmits the redundant data using the wireless communication device 200C.

As a result, the traffic control unit 2640 can improve throughput.

The wireless communication devices 200A to 200C used for the above-described data transmission are examples. The traffic control unit 2640 may, for example, randomly select a wireless communication device 200 to be used for parallel transmission. Alternatively, the traffic control unit 2640 may select the wireless communication device 200 to be used for parallel transmission in the order of index numbers attached to the wireless communication devices 200.

Figure 23:
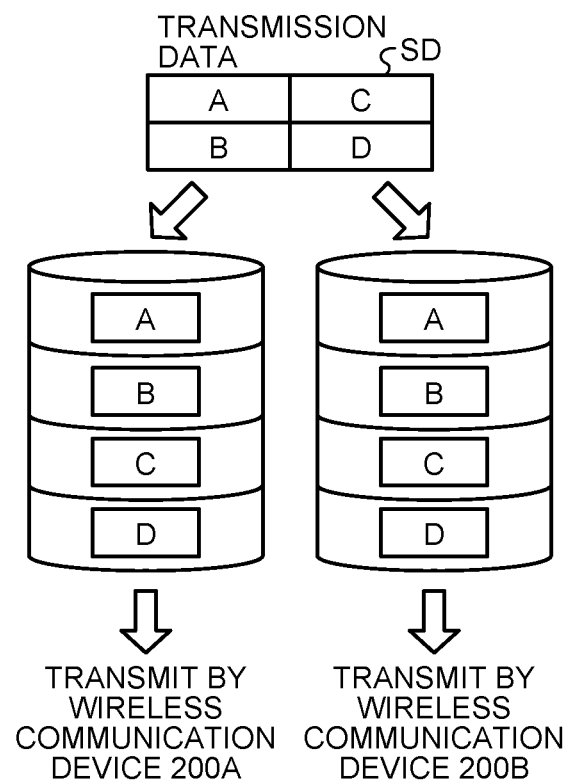
FIG. 23 is a view for explaining an example where data is made redundant by a traffic control unit.
Figure 24:
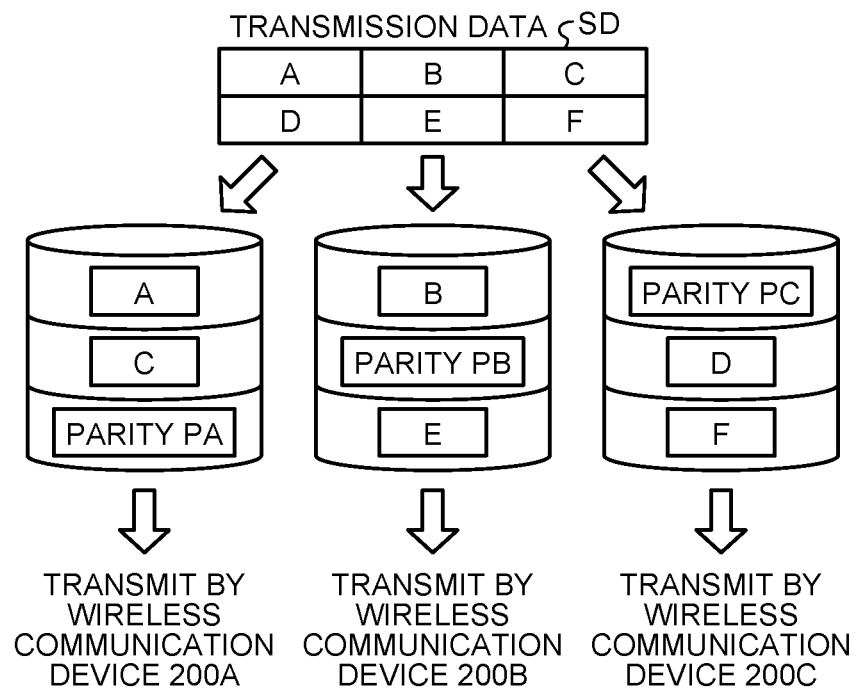
FIG. 24 is a view for explaining an example where data is made redundant by a traffic control unit.
Figure 25:
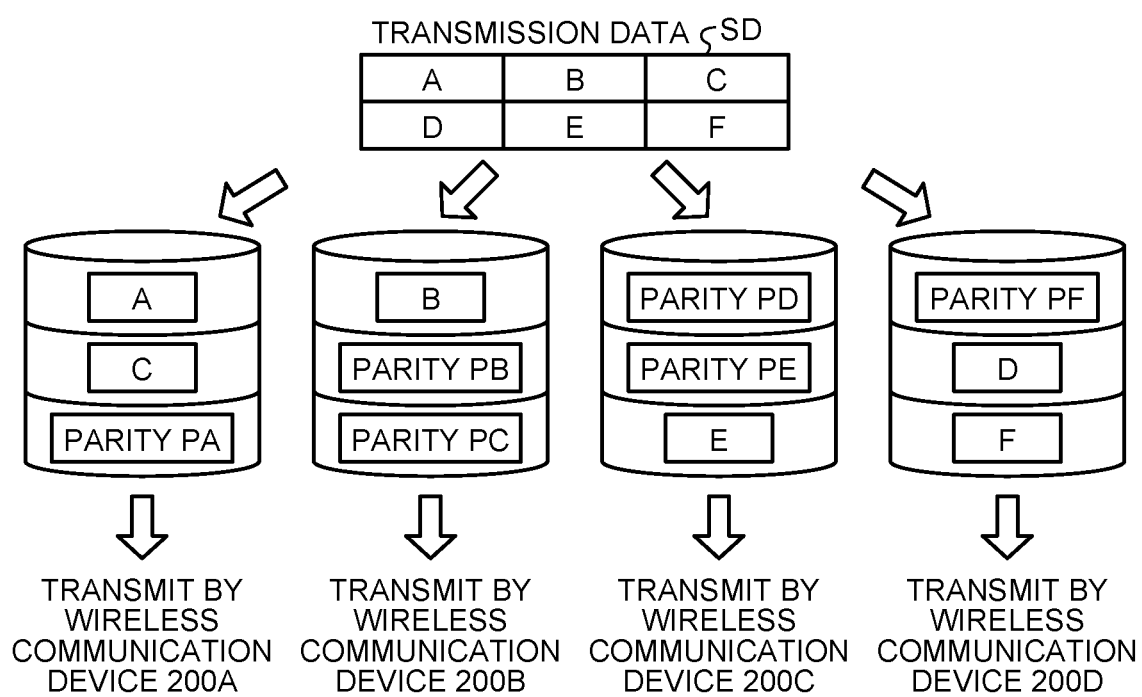
FIG. 25 is a view for explaining an example where data is made redundant by a traffic control unit.

FIGS. 23 to 25 is a view for explaining an example where data is made redundant by the traffic control unit 2640.

As illustrated in FIG. 23, the traffic control unit 2640 divides transmission data SD into four blocks of data A to data D. The traffic control unit 2640 generates data A to data D which are the same as the data A to the data D and transmits one of the data A to the data D using the wireless communication device 200A. Further, the traffic control unit 2640 transmits the other data A to data D using the wireless communication device 200B. It is assumed that the wireless communication device 200 sequentially transmits the data A to the data D.

In this way, by transmitting the same transmission data SD using different wireless communication devices 200, the terminal device 2000 can improve reliability while preventing degradation in throughput. While it is assumed here that the same transmission data SD is transmitted using each of the two wireless communication devices 200, the same transmission data SD may be transmitted using a plurality of wireless communication devices 200, and two or more wireless communication devices 200 may transmit the transmission data SD. As the number of the wireless communication devices 200 that transmit transmission data SD increases, the reliability of data transmission can be improved.

In FIG. 24, the traffic control unit 2640 divides the transmission data SD into six blocks of data A to data F. Further, the traffic control unit 2640 generates parity (redundant) data PA to parity data PC using the divided data A to F.

The traffic control unit 2640 allocates the divided data A to data F and the generated parity data PA to parity data PC to different wireless communication devices 200. In FIG. 24, the traffic control unit 2640 transmits the data A, the data C, and the parity PA using the wireless communication device 200A. Further, the traffic control unit 2640 transmits the data B, the parity data PB, and the data E using the wireless communication device 200B. The traffic control unit 2640 transmits the parity data PC, the data D, and the data F using the wireless communication device 200C. In this way, the terminal device 2000 can switch and transmit the parity data.

In FIG. 25, the traffic control unit 2640 generates parity data PA to parity data PF using the data A to data F divided into six blocks.

The traffic control unit 2640 allocates the divided data A to data F and the generated parity data PA to parity data PF to different wireless communication devices 200. In FIG. 25, the traffic control unit 2640 transmits the data A, the data C, and the parity PA using the wireless communication device 200A. Further, the traffic control unit 2640 transmits the data B, the parity data PB, and the parity PC using the wireless communication device 200B. The traffic control unit 2640 transmits the parity data PD, the parity data PE, and the data E using the wireless communication device 200C. The traffic control unit 2640 transmits the parity data PF, the data D, and the data F using the wireless communication device 200D.

By transmitting the data and the parity data as illustrated in FIG. 25, for example, even if data reception fails in two systems, if the remaining two systems can receive data, the receiving side can restore the transmission data.

As described above, the terminal device 2000 according to the third embodiment of the present disclosure switches the antenna module to be used while giving priority to a similar antenna module capable of forming a beam pattern in the same direction as the direction of the excluded antenna module.

As a result, the terminal device 2000 can perform communication while forming a similar beam pattern before and after the antenna module to be used is switched, so that it is possible to prevent fluctuation in communication quality before and after the antenna module to be used is switched. This is because a beam pattern can be formed in the same direction before and after switching by the antenna module which is being used, so that it is considered that the communication quality of the antenna module which is being used before and after switching does not change significantly.

Further, in a case where the data and the parity data are transmitted using a plurality of wireless communication devices 200, the plurality of wireless communication devices 200 may transmit the data and the parity data respectively using antenna modules capable of forming beam patterns in a similar direction. Specifically, for example, it is assumed that the wireless communication device 200A and the wireless communication device 200B transmit the data and the parity data. In this case, if the wireless communication device 200A selects, for example, the antenna module having the highest communication quality, the wireless communication device 200B selects an antenna module capable of forming a beam pattern in a direction similar to a direction of the antenna module selected by the wireless communication device 200A.

This is particularly effective in a case where a plurality of antenna modules having similar beam patterns is less likely to be shielded at the same time (communication quality is less likely to degrade), such as in a case where a distance between the wireless communication devices 200 is long.

Alternatively, in a case where the data and the parity data are transmitted using a plurality of wireless communication devices 200, some wireless communication devices 200 may use beam patterns that are not in a similar direction. This is because if all the wireless communication devices 200 perform communication using beam patterns in a similar direction, and if the communication quality of the communication in the beam patterns degrades, the communication quality of all the wireless communication devices 200 degrades. In order to prevent such degradation of the communication quality of all the wireless communication devices 200, some wireless communication devices 200 may use beam patterns that are not in a similar direction. This makes it possible to improve reliability of communication of the terminal device 200.

Specifically, for example, it is assumed that the wireless communication device 200A performs communication using a beam pattern in a direction of the best communication quality. In this case, when the wireless communication device 200B excludes a beam pattern similar to the beam pattern used by the wireless communication device 200A, the wireless communication device 200B performs communication using a beam pattern having the highest communication quality. Further, when the wireless communication device 200C excludes a beam pattern similar to the beam pattern used by the wireless communication device 200A and the wireless communication device 200B, the wireless communication device 200C performs communication using a beam pattern in a direction of the highest communication quality.

Further, while in the above-described example, in a case where the data and the parity data are transmitted using a plurality of wireless communication devices 200, all of the data and the parity data are transmitted using different wireless communication devices 200, the present disclosure is not limited to this. For example, the data (or the parity data) can be transmitted from virtually different wireless communication devices 200 by the data (or the parity data) being transmitted using different antenna modules of the same wireless communication device 200.

For example, in FIG. 24, the data A is transmitted from the wireless communication device 200A, the data B is transmitted from the wireless communication device 200B, and the parity PC is transmitted from the wireless communication device 200C. For example, the data A may be transmitted from the antenna module 2110A of the wireless communication device 200A, and the data B may be transmitted from the antenna module 2110B of the wireless communication device 200A.

By transmitting the data A and the data B from different antenna modules 2110A and 2110B of the same wireless communication device 200A, the data A and B reach the receiving side through different propagation paths. Thus, from the viewpoint of the receiving side, it seems as if the data A and B were transmitted from different wireless communication devices 200.

In this way, by transmitting the data or the parity data using different antenna modules of the same wireless communication device 200, it is possible to make it seem as if the data or the parity data were transmitted from virtually different wireless communication devices 200.

The parity PC may be transmitted from a wireless communication device (for example, the wireless communication device 200C) different from the wireless communication device 200A. Alternatively, the parity PC may be transmitted from an antenna module (for example, the antenna module 2110C) different from the antenna modules 2110A and 2110C of the wireless communication device 200A. It is assumed that which antenna module of which wireless communication device is used is determined, for example, in accordance with the communication quality of the antenna module.

In this way, in a case where the terminal device 2000 can perform simultaneous communication (downlink data reception and uplink data transmission) using a plurality of antenna modules, antenna modules capable of forming beam patterns in different directions of the same wireless communication device may be used. The antenna modules capable of forming beam patterns in different directions are unlikely to be shielded at the same time, so that even if some antenna modules are temporarily shielded by a shield, or the like, it is possible to prevent degradation of the communication quality of all antenna modules.

5. Other Modifications

While in the third embodiment described above, the terminal device 2000 includes a plurality of wireless communication devices 200 that performs communication using the same wireless communication scheme, the present disclosure is not limited to this. The terminal device 2000 may include a plurality of wireless communication devices 200 that performs communication using different wireless communication schemes. For example, the terminal device 2000 may include a wireless communication device 200L that performs communication using LTE and a wireless communication device 200G that performs communication using 5G-NR. The terminal device 2000 may include a plurality of wireless communication devices 200L and a plurality of wireless communication devices 200G.

In this configuration, in a case where the terminal device 2000 selects an antenna module to be used for the wireless communication device 200G that performs communication using 5G-NR, the terminal device 2000 selects the antenna module 2110 that is located far from the antenna module to be used for communication using LTE. For example, the terminal device 2000 determines the antenna module 2110 which is located farthest from the antenna module to be used for communication using LTE among the antenna modules to be used which have predetermined communication quality and whose temperatures are lower than the second temperature threshold $Th_{r2}$, as the antenna module to be used for communication using 5G-NR.

Figure 26:
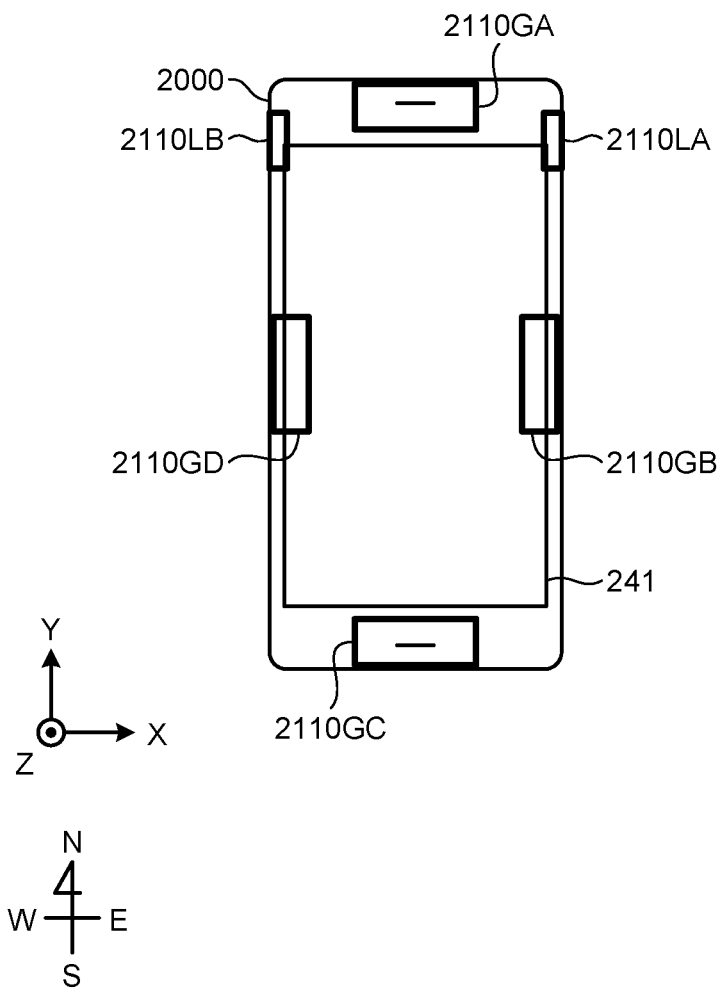
FIG. 26 is a view illustrating an example of arrangement of antenna modules according to a modification of the present disclosure.

FIG. 26 is a view illustrating an example of arrangement of antenna modules according to a modification of the present disclosure. Note that the coordinate axes illustrated in FIG. 26 are the same as the coordinate axes illustrated in FIG. 8.

In the example illustrated in FIG. 26, six antenna modules 2110GA to 2110GD, 2110LA, and 2110LB are provided at different positions of the terminal device 2000. The antenna modules 2110GA to 2110GD are antenna modules 2110GA to 2110GD to be used for communication in 5G-NR. The antenna modules 2110LA and 2110LB are antenna modules to be used for communication in LTE.

Arrangement of the antenna modules 2110GA to 2110GD is the same as arrangement of the antenna modules 2110A to 2110D illustrated in FIG. 8.

Further, the antenna module 2110LA is provided between the antenna module 2110GA and the antenna module 2110GB at an end portion of the terminal device 2000 in the positive direction of the X axis. The antenna module 2110LB is provided between the antenna module 2110GA and the antenna module 2110GB at an end portion of the terminal device 2000 in the negative direction of the X axis. Note that it is assumed that the antenna modules 2110LA and 2110LB are provided closer to the antenna module 2110GA than the antenna module GB.

Here, it is assumed that the terminal device 2000 performs communication in LTE using both the antenna modules 2110LA and 2110LB. A method for the terminal device 2000 to select the antenna module 2110 to be used for communication in 5G-NR in this case will be described. In this case, the terminal device 2000 sets the antenna module whose communication quality is equal to or higher than a predetermined quality threshold and whose temperature is lower than the second temperature threshold $Th_{r2}$ as the antenna module candidate. Here, it is assumed that the antenna modules 2110GA to 2110GC are set as the antenna module candidates.

Among the antenna module candidates, the terminal device 2000 determines the antenna modules 2110 far from the antenna modules 2110LA and 2110LB to be used for communication in LTE as the antenna module to be used for 5G-NR. For example, the terminal device 2000 determines, among the antenna module candidates, the antenna module 2110GC farthest from the antenna modules 2110LA and 2110LB to be used for communication in LTE as the antenna module to be used for 5G-NR.

Alternatively, the terminal device 2000 may determine the antenna module having the highest communication quality among the antenna module candidates provided at a predetermined distance from the antenna modules 2110LA and 2110LB to be used for communication in LTE as the antenna module to be used.

The temperature of the antenna module which is being used for communication rises as described above. Due to influence of such temperature rise, the temperature of the antenna module close to the antenna module which is being used also tends to rise. Thus, by setting an antenna module that is far from the antenna module which is being used for communication as an antenna module to be used for other communication, the antenna modules are less likely to be affected by temperature rise of each other, so that it is possible to prevent temperature rise of the antenna module which is being used.

Note that while a method for selecting the antenna module to be used in a case where communication is performed using different wireless communication schemes of LTE and 5G-NR has been described here, the antenna module to be used may be selected in a similar manner also in a case where communication is performed by different wireless communication devices 200 using the same wireless communication scheme.

For example, in a case of communication using Sub6 and communication using mmW, it is assumed that the terminal device 2000 selects the antenna module to be used for communication using mmW. In this case, the terminal device 2000 determines an antenna module provided at a position far from the antenna module to be used for communication using Sub6 as the antenna module to be used.

As described above, even in a case where the same wireless communication scheme is used, by the terminal device 2000 determining the antenna module to be used on the basis of arrangement of the antenna modules 2110, it is possible to prevent temperature rise of the antenna module to be used.

While in Modification 1 of the first embodiment described above, the antenna module 2110 whose temperature is equal to or higher than the second temperature threshold $Th_{r2}$ is disabled, the present disclosure is not limited to this. For example, the wireless communication device 200 may disable the antenna module 2110 whose communication quality is lower than a predetermined quality threshold.

Alternatively, it is also possible to disable the antenna module 2110 that generates a beam pattern in an opposite direction to a direction of the beam pattern which is being used for communication at the antenna module which is being used. For example, in a case where the antenna module 2110B in FIG. 8 is the antenna module which is being used, the wireless communication device 200 disables the antenna module 2110D.

The antenna module 2110 whose communication quality is lower than the predetermined quality threshold and the antenna module 2110 which generates a beam pattern in an opposite direction to a direction of the beam pattern which is being used for communication are less likely to be used for communication due to poor communication quality. In this way, by disabling the antenna module 2110 that is less likely to be used for communication, it is possible to prevent temperature rise of the antenna module 2110.

Further, while in the first to third embodiments described above, the antenna selection processing is executed regardless of transmission or reception, the present disclosure is not limited to this. For example, the wireless communication device 200 (terminal device 2000) may perform the antenna selection processing in accordance with a traffic amount.

Typically, the wireless communication device 200 consumes more power in uplink transmission than in downlink reception, and the temperature of the antenna module 2110 tends to rise.

Thus, in a case where the wireless communication device 200 (terminal device 2000) transmits uplink data, the antenna selection processing described in the first to third embodiments may be performed.

Specifically, in a case where the wireless communication device 200 (terminal device 2000) transmits uplink data, the antenna module to be used may be selected using the second temperature threshold $Th_{t2}$. In this case, for example, in a case where a traffic amount of uplink transmission is equal to or greater than a predetermined amount, the wireless communication device 200 (terminal device 2000) may select the antenna module to be used using the second temperature threshold $Th_{t2}$.

In this way, in a case where the traffic amount of uplink transmission is large and the temperature of the antenna module 2110 tends to rise, the wireless communication device 200 (terminal device 2000) may execute the antenna selection processing described in the first to third embodiments.

Further, in a case where downlink data is received, the wireless communication device 200 (terminal device 2000) may select the antenna module to be used on the basis of the first temperature threshold $Th_{t1}$ without using the second temperature threshold $Th_{t2}$. In this case, for example, in a case where a traffic amount of downlink reception is less than a predetermined amount, the wireless communication device 200 (terminal device 2000) may select the antenna module to be used on the basis of the first temperature threshold $Th_{t1}$ without using the second temperature threshold $Th_{t2}$.

As described above, in a case where the traffic amount of downlink reception is small and the temperature of the antenna module 2110 is less likely to rise, the wireless communication device 200 (terminal device 2000) may not execute the antenna selection processing described in the first to third embodiments.

Alternatively, in a case where QoS is not set for the traffic, or in a case where the slice is not a high-reliability and low-delay slice, the wireless communication device 200 (terminal device 2000) may execute the antenna selection processing described in the first to third embodiments. In this case, in a case where QoS is set for the traffic, or in a case where the slice is a high-reliability and low-delay slice, the wireless communication device 200 (terminal device 2000) does not execute the antenna selection processing described in the first to third embodiments.

Whether or not QoS is set is determined by, for example, APN setting or whether or not mobile edge computing (MEC, also referred to as multi-access edge computing) notified from a network is used. Alternatively, whether or not QoS is set may be determined in accordance with a type of a bearer of which the wireless communication device 200 (terminal device 2000) is notified from the network.

Alternatively, the wireless communication device 200 (terminal device 2000) may switch use of the second temperature threshold $Th_{t2}$ in accordance with an application which is being used by the user. In other words, the wireless communication device 200 (terminal device 2000) may switch whether or not to execute the antenna selection processing in accordance with the application which is being used by the user.

For example, in a case where the user is watching a moving image or using a game application, the wireless communication device 200 (terminal device 2000) does not perform the antenna selection processing described in the first to third embodiments because high-reliability and low-delay communication is required. On the other hand, for example, in a case of communication that does not require high reliability and low delay, such as browsing and chat applications, the wireless communication device 200 (terminal device 2000) executes the antenna selection processing described in the first to third embodiments.

Note that while in the first to third embodiments described above, the wireless communication device 200 (terminal device 2000) selects the antenna module to be used on the basis of the communication quality and the temperature, the present disclosure is not limited to this. For example, the wireless communication device 200 (terminal device 2000) may select the antenna module to be used using a classifier which is generated on the basis of machine learning or deep learning by inputting communication quality, a temperature, posture and a traffic amount of the wireless communication device 200 (terminal device 2000), or the like.

Alternatively, the wireless communication device 200 (terminal device 2000) may also use machine learning or deep learning to determine whether or not to switch the antenna module which is being used. Further, the wireless communication device 200 (terminal device 2000) may select the beam pattern to be used for communication in addition to the antenna module to be used on the basis of machine learning or deep learning.

Further, a data set to be input to the classifier generated on the basis of machine learning or deep learning is not limited to the above-described examples, and in addition to the above-described examples, various kinds of data such as, for example, the position of the user's hand and the application which is being used by the user can be input.

6. Hardware Configuration Example

Figure 27:
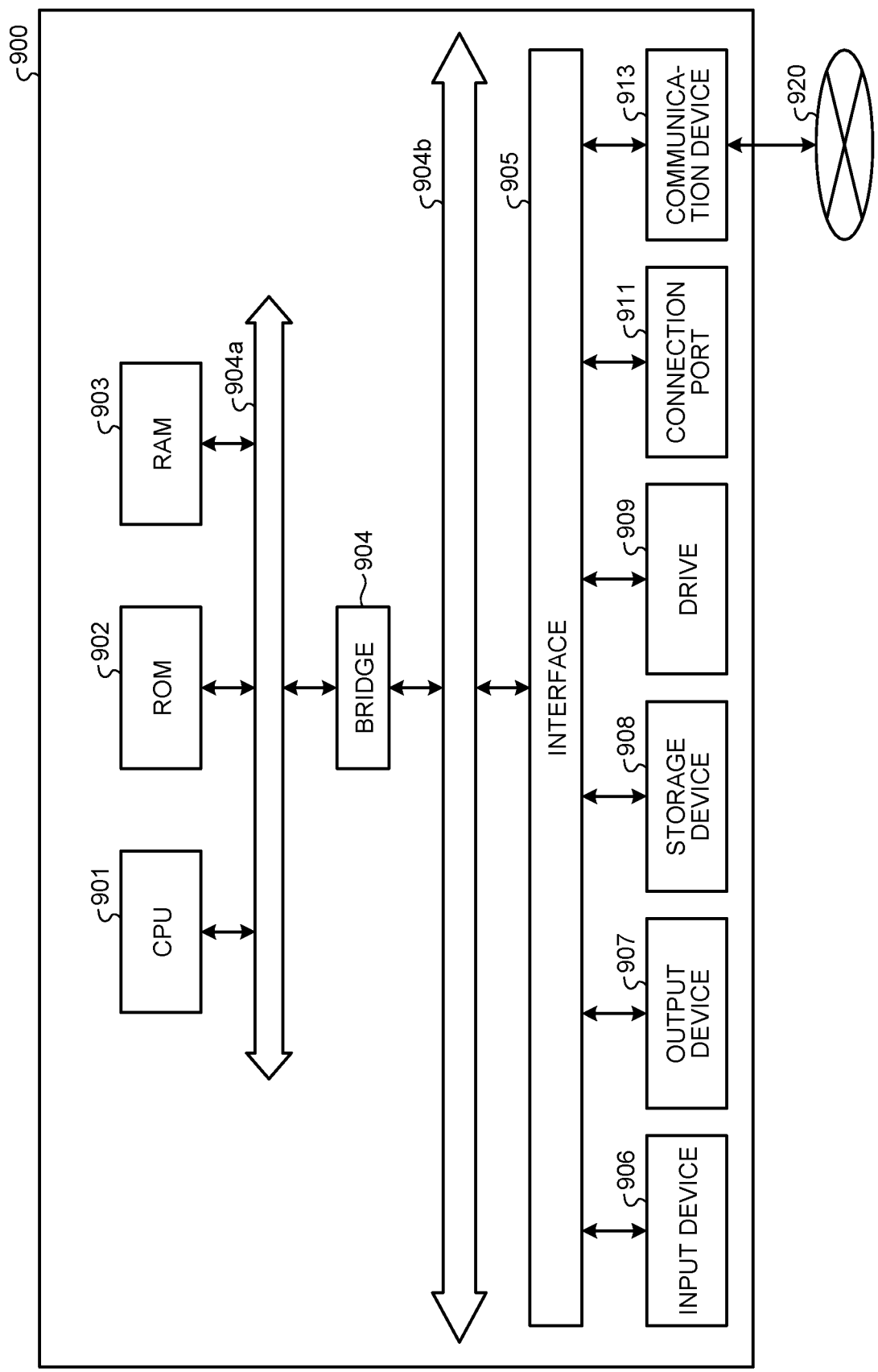
FIG. 27 is a block diagram illustrating an example of a hardware configuration of an information processing device according to the embodiment of the present disclosure.

Lastly, with reference to FIG. 27, a hardware configuration of an information processing apparatus according to the present embodiment is described. FIG. 27 is a block diagram illustrating an example of a hardware configuration of an information processing device according to the present embodiment. Note that an information processing apparatus 900 illustrated in FIG. 27 can realize, for example, the wireless communication device 200 illustrated in FIG. 5. The information processing by the wireless communication device 200 according to the present embodiment is realized by cooperation of software and hardware described below.

As illustrated in FIG. 27, the information processing apparatus 900 includes a central processing unit (CPU) 901, a read only memory (ROM) 902, a random access memory (RAM) 903, and a host bus 904a. Furthermore, the information processing apparatus 900 includes a bridge 904, an external bus 904b, an interface 905, an input device 906, an output device 907, a storage device 908, a drive 909, a connection port 911, and a communication device 913. The information processing apparatus 900 may include a processing circuit such as an electric circuit, a DSP or an ASIC instead of or in addition to the CPU 901.

The CPU 901 functions as an arithmetic processing unit and a control device, and controls the overall operation in the information processing apparatus 900 according to various programs. Furthermore, the CPU 901 may be a microprocessor. The ROM 902 stores programs, arithmetic parameters, and the like, which are used by the CPU 901. The RAM 903 temporarily stores the programs used in the execution of the CPU 901 and the parameters that suitably vary in this execution, and the like. The CPU 901 can form, for example, the control unit 260 illustrated in FIG. 5 and FIG. 13.

The CPU 901, the ROM 902, and the RAM 903 are mutually connected by the host bus 904a including a CPU bus and the like. The host bus 904a is connected with the external bus 904b such as a peripheral component interconnect/interface (PCI) bus via the bridge 904. The host bus 904a, the bridge 904, and the external bus 904b are not necessarily separately configured, and these functions may be implemented on one bus.

The input device 906 is implemented by, for example, a device such as a mouse, a keyboard, a touch panel, buttons, a microphone, a switch, and a lever to which information is input by the user. Furthermore, the input device 906 may be, for example, a remote control device using infrared rays or other radio waves, or may be an external connection device such as a mobile phone or a PDA corresponding to the operation of the information processing apparatus 900. Furthermore, the input device 906 may include, for example, an input control circuit that generates an input signal based on the information input by the user using the input means described above, and outputs the generated input signal to the CPU 901. The user of the information processing apparatus 900 can input various data to the information processing apparatus 900 and give an instruction on processing operations by operating the input device 906.

In addition to the above, the input device 906 can be formed by a device that detects information related to the user. For example, the input device 906 can include various sensors such as an image sensor (a camera, for example), a depth sensor (a stereo camera, for example), an acceleration sensor, a gyro sensor, a geomagnetic sensor, an optical sensor, a sound sensor, a distance measurement sensor, and a force sensor. Further, the input device 906 may acquire information regarding a state of the information processing apparatus 900 such as a posture or moving speed of the information processing apparatus 900, and information regarding an environment surrounding the information processing apparatus 900 such as luminous intensity and noise around the information processing apparatus 900. Also, the input device 906 may include a global navigation satellite system (GNSS) module that receives a GNSS signal (a GPS signal from a global positioning system (GPS) satellite, for example) from a GNSS satellite and measures position information including the latitude, the longitude, and the altitude of the device. In addition, regarding the position information, the input device 906 may detect the position through Wi-Fi (registered trademark), transmission and reception with a mobile phone, a PHS, a smartphone, or the like, or short-range communication, or the like. The input device 906 may form the sensor unit 230 illustrated in FIG. 13, for example.

The output device 907 is formed of a device capable of visually or aurally notifying the user of the acquired information. As such devices, there are a display device such as a CRT display device, a liquid crystal display device, a plasma display device, an EL display device, a laser projector, an LED projector or a lamp, a voice output device such as a speaker and a headphone, a printer device, and the like. The output device 907 outputs, for example, results obtained by various processes performed by the information processing apparatus 900. Specifically, the display device visually displays the results obtained by the various processes performed by the information processing apparatus 900 in various formats, such as text, image, table, and graph. The voice output device converts an audio signal composed of reproduced audio data, acoustic data, and the like into an analog signal and aurally outputs it. The output device 907 may form the output unit 240 illustrated in FIG. 5 and FIG. 13, for example.

The storage device 908 is a device for data storage formed as an example of a storage unit of the information processing apparatus 900. The storage device 908 is implemented by, for example, a magnetic storage device such as an HDD, a semiconductor storage device, an optical storage device, a magneto-optical storage device, or the like. The storage device 908 may include a storage medium, a recording device for recording data on the storage medium, a reading device for reading data from the storage medium, a deletion device for deleting data recorded on the storage medium, and the like. The storage device 908 stores programs and various types of data executed by the CPU 901, various types of data acquired from the outside, and the like. The storage device 908 may form the storage unit 250 illustrated in FIG. 5 and FIG. 13, for example.

The drive 909 is a reader/writer for a storage medium, and is built in or externally attached to the information processing apparatus 900. The drive 909 reads information recorded in a removable storage medium such as a mounted magnetic disk, optical disk, magneto-optical disk, or semiconductor memory, and outputs the information to the RAM 903. In addition, the drive 909 can write information into the removable storage medium.

The connection port 911 is an interface connected to an external device, and serves as a connection port to an external device capable of transmitting data by universal serial bus (USB), for example.

The communication device 913 is, for example, a communication interface formed of a communication device or the like for connecting to a network 920. The communication device 913 is a communication card or the like for a wired or wireless local area network (LAN), long term evolution (LTE), Bluetooth (registered trademark), or wireless USB (WUSB), for example. In addition, the communication device 913 may be a router for optical communication, a router for asymmetric digital subscriber line (ADSL), various communication modems, or the like. The communication device 913 can transmit and receive signals and the like according to a predetermined protocol such as TCP/IP, for example, over the Internet or with another communication device. The communication device 913 may form the antenna module 2110 and the wireless communication unit 2120 illustrated in FIG. 5 and FIG. 13, for example.

The network 920 is a wired or wireless transmission path of information transmitted from a device connected to the network 920. For example, the network 920 may include a public circuit network such as the Internet, a telephone circuit network, or a satellite communication network, various local area networks (LANs) including Ethernet (registered trademark), a wide area network (WAN), and the like. The network 920 may also include a dedicated line network such as an Internet protocol-virtual private network (IP-VPN).

Heretofore, an example of the hardware configuration capable of realizing the functions of the information processing apparatus 900 according to the embodiment has been described. The above-described components may be implemented using universal members, or may be implemented by hardware specific to the function of the respective components. Accordingly, the hardware configuration to be used can be changed as appropriate according to the technical level at the time of carrying out the present embodiment.

Note that a computer program for realizing each function of the information processing apparatus 900 according to the above-described present embodiment can be prepared and implemented on a PC or the like. In addition, a computer-readable recording medium storing such a computer program may also be provided. The recording medium is a magnetic disc, an optical disc, a magneto-optical disc, a flash memory, or the like, for example. Furthermore, the above-described computer program may be distributed via, for example, a network without using any recording medium.

7. Conclusion

As described above, each embodiment of the present disclosure has been described in detail with reference to FIG. 1 to FIG. 27. As described above, the wireless communication device (corresponding to the wireless communication device 200 or the terminal device 2000) according to the present embodiment includes a control unit (corresponding to the control unit 260 or the communication control unit 2100). Then, the control unit acquires the temperatures of a plurality of antennas having different directivities (corresponding to the antenna module 2110). The control unit acquires information regarding the communication quality of the plurality of antennas. In a case where the temperature of the antenna which is being used for communication (corresponding to the antenna module which is being used) is equal to or higher than the second temperature threshold $Th_{t2}$ which is lower than the first temperature threshold $Th_{t1}$ for determining whether or not to stop using the antenna, the control unit switches the antenna which is being used to an antenna selected on the basis of the communication quality among the antennas whose temperatures are lower than the second temperature threshold $Th_{t2}$.

As a result, use of the antenna which is being used can be stopped before the temperature becomes high, so that it is possible to shorten a period required for decreasing the temperature to the third temperature threshold Th3 at which use of the antenna is resumed. In other words, use of the antenna whose temperature has risen can be resumed sooner, so that it is possible to make a period of use of the antenna longer. Accordingly, the communication quality of the wireless communication device can be maintained for a longer period of time.

As described above, the favorable embodiments of the present disclosure have been described in detail with reference to the accompanying drawings, but the technical scope of the present disclosure is not limited to such examples. A person skilled in the art may find various alterations and modifications within the scope of the appended claims, and it should be understood that they will naturally come under the technical scope of the present disclosure.

For example, while in the above embodiment, the proposed technique is applied in the first frequency band, the present technique is not limited to such an example. For example, the proposed technique may be applied in the second frequency band.

Further, the processes described using the flowcharts and the sequence diagrams in this specification need not be necessarily executed in the described order. Several process steps may be executed in parallel. Further, an additional process step may be employed, and some process steps may be omitted.

Further, it is also possible to create a computer program for causing a processor (such as, for example, a CPU, a DSP and a baseband (BB) processor) provided at the device of the present specification (for example, a base station, a base station device or a module for a base station device, or a terminal device or a module for a terminal device) to function as components (such as, for example, the temperature acquisition unit 261, the quality acquisition unit 262 and/or the antenna selection unit 263) of the above-described device (in other words, a computer program for causing the above-described processor to execute operation of the components of the above-described device). In addition, it is also possible to provide a recording medium on which the computer program is recorded. Further, it is also possible to provide a device including a memory for storing the above-described computer program and one or more processors capable of executing the above-described computer program (for example, a base station, a base station device, a module for a base station device, or a terminal device, or a module for a terminal device). Further, a method including the operation of the components of the above-described device (such as, for example, the temperature acquisition unit 261 and the quality acquisition unit 262 and/or the antenna selection unit 263) is also included in the technique according to the present disclosure.

Furthermore, the effects described in the present specification are merely illustrative or exemplary and are not restrictive. That is, the technology according to the present disclosure can exhibit other effects obvious to those skilled in the art from the description of the present specification in addition to or in place of the above-described effects.

Note that the following configuration also belong to the technical scope of the present disclosure.

(1)

A wireless communication device comprising:

a control unit configured to respectively acquire temperatures of a plurality of antennas with different directivities, respectively acquire information regarding communication quality of a plurality of the antennas, in a case where the temperature of an antenna which is being used for communication is equal to or higher than a second temperature threshold lower than a first temperature threshold for determining whether or not to stop using the antenna, switch the antenna which is being used to the antenna selected on a basis of the communication quality among the antennas for which the temperatures are lower than the second temperature threshold.

(2)

The wireless communication device according to (1), wherein in a case where the communication quality of all the antennas for which the temperatures are lower than the second temperature threshold is lower than a quality threshold, the control unit continuously uses the antenna which is being used and for which it is determined that the temperature is equal to or higher than the second temperature threshold, for communication.

(3)
The wireless communication device according to (1) or (2),
wherein in a case where the communication quality of all the antennas for which the temperatures are lower than the second temperature threshold is lower than the quality threshold, the control unit switches the antenna which is being used on a basis of the communication quality.

(4)
The wireless communication device according to any one of (1) to (3),
wherein in a case where it is determined that the temperature of the antenna for which it is determined that the temperature is equal to or higher than the second temperature threshold, decreases to lower than a third temperature threshold, the control unit determines the antenna as a candidate for the antenna to be used.

(5)
The wireless communication device according to any one of (1) to (4),
wherein the control unit switches a threshold to be used for determining the antenna to be used to one of the first temperature threshold or the second temperature threshold in accordance with an application that performs the communication.

(6)
The wireless communication device according to any one of (1) to (4),
wherein the control unit switches a threshold to be used for determining the antenna which is being used to one of the first temperature threshold or the second temperature threshold in accordance with quality required for the communication.

(7)
The wireless communication device according to any one of (1) to (6),
in a case where the temperature of the antenna which is being used exceeds the second temperature threshold, the control unit outputs information for changing a position of a chassis on which the antenna is mounted.

(8)
The wireless communication device according to (7), wherein the information is information for encouraging a user to change posture of the chassis.

(9)
The wireless communication device according to (7), wherein the information is information for moving a movable portion of the chassis.

(10)
The wireless communication device according to (7), wherein the chassis is a chassis of a mobile body, and
the information is information for moving the mobile body.

(11)
The wireless communication device according to any one of (1) to (10),
wherein the control unit disables the antenna for which it is determined that the temperature is equal to or higher than the first temperature threshold.

(12)
The wireless communication device according to any one of (1) to (11),
wherein the control unit disables the antenna for which it is determined that the temperature is equal to or higher than the second temperature threshold.

(13)
The wireless communication device according to any one of (1) to (12),
wherein the control unit disables the antenna except the antenna which is being used.

(14)
The wireless communication device according to any one of (11) to (13),
wherein the control unit disables the antenna by stopping at least one of transmission or reception of data using the antenna, detection of a control signal, detection of a synchronization signal or notification channel information or reception of a reference signal.

(15)
The wireless communication device according to any one of (11) to (13),
wherein the control unit disables the antenna by lengthening a reception stop period in discontinuous reception using the antenna.

(16)
A selection method comprising:
respectively acquiring temperatures of a plurality of antennas with different directivities;
respectively acquiring information regarding communication quality of a plurality of the antennas; and
comparing a second temperature threshold which is lower than a first temperature threshold for determining whether or not to stop using the antenna with the temperatures and selecting an antenna to be used for communication among the antennas for which the temperatures are lower than the second temperature threshold on a basis of the communication quality.

REFERENCE SIGNS LIST

1 SYSTEM
10 CELL
20 CORE NETWORK
30 PDN
100 BASE STATION
200 WIRELESS COMMUNICATION DEVICE
230 SENSOR UNIT
240 OUTPUT UNIT
250 STORAGE UNIT
260 CONTROL UNIT
2000 TERMINAL DEVICE
2110 ANTENNA MODULE
2120 WIRELESS COMMUNICATION UNIT

The invention claimed is:
1. A wireless communication devie, comprising:
a control unit configured to:
respectively acquire temperatures of a plurality of antennas with different directivities;
respectively acquire information regarding communication quality of the plurality of antennas; and
in a case where a temperature of a first antenna of the plurality of antennas which is being used for communication is equal to or higher than a second temperature threshold that is lower than a first temperature threshold for determining whether or not to stop using the first antenna, switch the first antenna which is being used to a second antenna selected on a basis of the communication quality among the plurality of antennas for which the temperatures are lower than the second temperature threshold, wherein
in a case where it is determined that the temperature of the first antenna for which it is determined that the temperature is equal to or higher than the second temperature threshold, decreases to lower than a third temperature threshold, the control unit is further configured to determine the first antenna as a candidate for an antenna to be used, and
in a case where the temperature of the first antenna which is being used exceeds the second temperature threshold, the control unit outputs information for changing a position of a chassis on which the first antenna is mounted.

2. The wireless communication device according to claim 1, wherein the information for changing the position of the chassis is information for encouraging a user to change posture of the chassis.

3. The wireless communication device according to claim 1, wherein the information for changing the position of the chassis is information for moving a movable portion of the chassis.

4. The wireless communication device according to claim 1, wherein the chassis is a chassis of a mobile body, and the information for changing the position of the chassis is information for moving the mobile body.

5. The wireless communication device according to claim 1, wherein the control unit is further configured to disable an antenna for which it is determined that the temperature is equal to or higher than the first temperature threshold.

6. The wireless communication device according to claim 5, wherein the control unit is further configured to disable the antenna for which it is determined that the temperature is equal to or higher than the second temperature threshold.

7. The wireless communication device according to claim 6, wherein the control unit is further configured to disable the antenna except when the antenna is being used.

8. The wireless communication device according to claim 5, wherein the control unit is further configured to disable the antenna by stopping at least one of transmission or reception of data using the antenna, detection of a control signal one, detection of a synchronization signal or notification channel information or reception of a reference signal.

9. The wireless communication device according to claim 5, wherein the control unit is further configured to disable the antenna by lengthening a reception stop period in discontinuous reception using the antenna.

10. A selection method, comprising:
respectively acquiring temperatures of a plurality of antennas with different directivities;
respectively acquiring information regarding communication quality of the plurality of antennas; and
comparing a second temperature threshold which is lower than a first temperature threshold for determining whether or not to stop using a first antenna of the plurality of antennas with the temperatures and selecting a second antenna to be used for communication among the plurality of antennas for which the temperatures are lower than the second temperature threshold on a basis of the communication quality, wherein
in a case where it is determined that the temperature of the first antenna for which it is determined that the temperature is equal to or higher than the second temperature threshold, decreases to lower than a third temperature threshold, determining the first antenna as a candidate for an antenna to be used, and
in a case where the temperature of the first antenna which is being used exceeds the second temperature threshold, outputting information for changing a position of a chassis on which the first antenna is mounted.

* * * * *